(12) United States Patent
Vaganov et al.

(10) Patent No.: US 7,318,349 B2
(45) Date of Patent: Jan. 15, 2008

(54) THREE-AXIS INTEGRATED MEMS ACCELEROMETER

(76) Inventors: Vladimir Vaganov, 129 El Porton, Los Gatos, CA (US) 95032; Nickolai Belov, 118 Plazoleta, Los Gatos, CA (US) 95032

( * ) Notice: Subject to any disclaimer, the term of this patent is extended or adjusted under 35 U.S.C. 154(b) by 349 days.

(21) Appl. No.: 11/160,004

(22) Filed: Jun. 4, 2005

(65) Prior Publication Data
US 2006/0272413 A1    Dec. 7, 2006

(51) Int. Cl.
*G01P 15/08* (2006.01)
(52) U.S. Cl. .................................. 73/514.33; 73/514.38
(58) Field of Classification Search ............. 73/514.33, 73/514.36, 514.38
See application file for complete search history.

(56) References Cited

U.S. PATENT DOCUMENTS

| | | | | | |
|---|---|---|---|---|---|
| 4,891,985 | A | * | 1/1990 | Glenn ...................... | 73/514.38 |
| 5,231,879 | A | * | 8/1993 | Yamamoto ............... | 73/514.33 |
| 5,295,386 | A | * | 3/1994 | Okada ........................ | 73/1.07 |
| 5,351,542 | A | * | 10/1994 | Ichimura et al. ......... | 73/514.33 |
| 5,412,986 | A | * | 5/1995 | Beringhause et al. .... | 73/514.33 |
| 2003/0209075 | A1* | | 11/2003 | Okada ..................... | 73/514.16 |

* cited by examiner

*Primary Examiner*—John E. Chapman

(57) ABSTRACT

3D accelerometer for measuring three components of inertial force (or acceleration) vector with respect to an orthogonal coordinate system, which has high sensitivity due to a big proof mass located within a cavity beneath the surface of the sensor die. The size of the cavity and the size of the proof mass exceed the corresponding overall dimensions of the elastic element. The sensor structure occupies a very small area at the surface of the die increasing the area for ICs need to be integrated on the same chip.

11 Claims, 14 Drawing Sheets

PRIOR ART

THREE-AXIS INTEGRATED MEMS ACCELEROMETER

REFERENCES

U.S. patent documents

| | | |
|---|---|---|
| 1. 4,882,933 | November 1989 | Petersen et al. 73/517 |
| 2. 4,967,605 | November 1990 | Okada 73/517 |
| 3. 5,121,633 | June 1992 | Murakami et al. 73/517 |
| 4. 5,182,515 | January 1993 | Okada 73/517 |
| 5. 5,295,386 | March 1994 | Okada 73/517 |
| 6. 5,485,749 | January 1996 | Nohara 73/517 |

BACKGROUND OF THE INVENTION

1. Field of the Invention

This invention relates to semiconductor devices, Micro Electro Mechanical Systems (MEMS), sensors and more specifically to three dimensional (3D) three-axis accelerometers, vibration sensors and inclinometers for consumer and other applications.

2. Description of the Related Art

MEMS accelerometers are known for more than 30 years and they are widely used in different areas. Automotive air-bag applications currently represent the biggest MEMS accelerometer market.

There are only few known MEMS three-axis (or 3D) accelerometers that can measure all three components of an acceleration vector.

The market for 3D accelerometers includes hand-held devices (cell phones, PDAs, hand-held computers, gaming devices, remote controls, etc.); health and sport products (ergometers, smart shoes, patient posture indicators, pacemakers, biometric devices and systems, etc.); monitoring systems for civil objects (bridges, buildings, etc.); smart toys; virtual reality devices, and more. However, available 3D accelerometers impede market growth because of their high cost. Most of the above markets require low-cost, stable and reliable 3D accelerometers. Therefore, there is a need for a low-cost single die 3D accelerometer that possesses all the above-mentioned features.

FIG. 1 illustrates a structure of a three-axis accelerometer known from the prior art (U.S. Pat. No. 5,485,749).

Fabrication of this 3D accelerometer requires special silicon-on-insulator (SOI) material. SOI silicon wafers are standard initial material for many semiconductor devices. SOI wafers are fabricated using fusion bonding of two silicon wafers. At least one silicon wafer contains an insulator layer at the bonding interface. Therefore, two layers of silicon are electrically insulated after bonding. Thermally grown silicon dioxide is usually used as a dielectric layer at the interface of the bonded silicon wafers. After bonding, one wafer is usually thinned down to a predetermined thickness that is typically much smaller than the initial thickness of the wafer. This thin layer is used for fabrication of functional components of semiconductor devices and is called a device layer. The other wafer is typically not thinned and is called a handle wafer or handle layer.

Either one or both wafers used for SOI wafer fabrication can be micromachined before bonding. A profile is formed at the sides of the wafers that are facing each other during the bonding process. This allows making SOI wafers with buried cavities.

The 3D accelerometer die 10 shown in FIG. 1 is described in the U.S. Pat. No. 5,485,749. It is fabricated from SOI wafer with buried cavities. The thickness of the device layer 30 is much smaller than the thickness of the handle layer 28. The buried cavities 32 are located at the interface between the device and the handle layers.

The structure of the 3D accelerometer contains a frame 12, a proof mass 14 and an elastic element (suspension beams 16, 18, 20, 22) that connects the frame 12 and the proof mass 14. When acceleration is applied to the proof mass 14, it tends to move with respect to the frame causing mechanical stress in the suspension beams 16, 18, 20, and 22. Piezoresistors 24, 26 located on the suspension beams are used to generate electrical signals in response to the mechanical stress. All three components of acceleration vector can be determined by processing the signals from the piezoresistors 24, 26.

The proof mass 14 is formed by double-side etching. In the structure shown in FIG. 1, deep backside wet etching is used to etch through the handle layer 28. The device layer 30 is micromachined by etching slots 38 from the front side of the SOI wafer. These slots are connected with the cavities 36 etched from the backside of the wafer and separate the proof mass 14 and the frame 12.

The suspension beams 16, 18, 20, and 22 are formed by etching slots 38 through the device layer from the front side of the SOI wafer.

The 3D accelerometer structure described above has several disadvantages.

The state-of-the-art multi-axis accelerometers integrate both sensor elements and IC circuits for analog and digital signal conditioning and processing on the same chip. Therefore, it is desirable to minimize the area occupied by the proof mass and the suspension on the front side of the chip where the IC circuits are located.

In the die shown in FIG. 1, the area occupied by the proof mass 14 and the suspension 16, 18, 20, and 22 on the front side of the wafer is not used for any IC circuitry.

The volume and the value of the proof mass are limited by the area of elastic element and can't be increased further.

Besides that, the described three-axis accelerometer does not provide means for protection of the accelerometer structure from shock overload.

SUMMARY OF THE INVENTION

The 3D accelerometer for measuring three components of inertial force (or acceleration) vector with respect to an orthogonal coordinate system according to the present invention overcomes the disadvantages of prior art devices. A present invention describes a small-size single-die three-axis MEMS accelerometer that provides high sensitivity to acceleration, equal or comparable sensitivity to all three components of acceleration vector, low cross-axis sensitivity, low power consumption, high reliability and high long-term stability. This three-axis accelerometer has extremely low cost, especially in high volume production, due to a simple high-yield micromachining process fully compatible with IC processing, low-cost packaging based on wafer-level packaging and a simple testing process.

The invented 3D accelerometer for determining components of an inertial force vector with respect to an orthogonal coordinate system according to the present invention comprises a sensor die having front side (or side 1) and opposite back side (or side 2). The die made of a semiconductor substrate consists of a device layer (or layer 1) and a handle layer (or layer 2) of semiconductor materials attached to each other and has a set of buried cavities at the interface between the layers. The set of cavities contains at least one buried cavity and has a projection on the plane of side 1 of the sensor die. The set of cavities can be either a single continuous object or can contain several separate parts. The set of cavities, either as a single object or a totality of its separate parts, has X and Y overall dimensions in the plane parallel to side 1. The sensor die comprises a frame element consisting of a thick part (or part 1) having thickness and a thin part (or part 2) having uniform thickness smaller than thickness of part 1 and surrounded by part 1; a proof mass element; an elastic element having thickness and mechanically coupling the frame and the proof mass elements on the front side of the semiconductor substrate, and at least one cap mechanically coupled to the frame element from at least back side of the sensor die. An inertial force applied to the proof mass element induces stress in the elastic element. The elastic element can be either single continuous object, like a diaphragm, or can contain several separate parts, like beams. The elastic element, either as a single object or a totality of its separate parts, has X and Y overall dimensions in the plane parallel to side 1 and has a thickness. At least two dimensions of the proof mass element exceed the corresponding overall dimensions of the elastic element. All components of the elastic element are located within the projection of the set of cavities on the plane of side 1 of the sensor die. The overall dimensions of the set of cavities in the plane of side 1 of the sensor die exceed the corresponding overall dimensions of the elastic element.

Another 3D accelerometer for determining components of an inertial force vector with respect to an orthogonal coordinate system comprises a sensor die having front side (or side 1) and opposite back side (or side 2). The die made of a semiconductor substrate consists of a device layer (or layer 1) and a handle layer (or layer 2) of semiconductor materials attached to each other and has at least one buried cavity at the interface between the layers. The sensor die comprises a frame element, a proof mass element, an elastic element having thickness and mechanically coupling the frame and the proof mass elements on the front side of the semiconductor substrate; mechanical stress sensitive IC components located on elastic element; and at least one electronic circuit coupled to the accelerometer. The frame element consists of a thick part (or part 1) having thickness and a thin part (or part 2) having uniform thickness smaller than thickness of part 1 and surrounded by part 1. An inertial force applied to the proof mass element induces stress in the elastic element. At least one electronic circuit is integrated within the thin part of the sensor die frame.

The present invention provides important advantages and benefits to 3D accelerometers. In particular:

First, 3D accelerometer mechanical structure—proof mass and elastic element—occupies a small area on the front side of the sensor dice. However, lateral dimensions of the proof mass are significantly larger than the area occupied by the 3D accelerometer mechanical structure on the front side of the sensor die. This allows increasing sensitivity of the 3D accelerometer and achieving either equal sensitivity to X, Y, and Z components of acceleration vector or a desired ratio between sensitivities to these three components of acceleration vector. Reduced size of the area occupied by 3D accelerometer mechanical structure on the front side of the sensor die allows reduction of both the die size and cost. Besides, increased sensitivity of the sensor allows simplification of signal conditioning and processing circuitry that results in additional decreasing of the die size and cost and decreasing of power consumption.

Second, a significant portion of area located above the proof mass is used for IC circuitry. This also allows reduction of both the die size and cost.

Third, the special mechanical structures—stops, which limit the maximum motion of the proof mass with respect to the other parts of the mechanical structure (frame, elastic element, and at least one cap)—are incorporated into the 3D accelerometer. Stops limit both the maximum forward motion of the proof mass in opposite directions along each of the three orthogonal axes and its maximum rotation in opposite angular directions around each of three orthogonal axes. Stops can be fabricated in the sensor die and in the caps.

The stops formed within the sensor die limit the maximum forward motion of the proof mass in opposite directions along two orthogonal lateral axes (located in the plane of the front side of the sensor die), in one direction along the vertical axis (perpendicular to the surface of the sensor die), and its maximum rotation in opposite directions around each of three orthogonal axes. This simplifies design of the cap wafers and in some cases allows using only one cap connected to the back side of the sensor die. Simplification of the cap wafer design and fabrication results in additional cost reduction.

The stops formed in the caps limit the maximum forward motion of the proof mass in opposite directions along the vertical axis (perpendicular to the surface of the sensor die), and its maximum rotation in opposite directions around two orthogonal lateral axes (located in the plane of the front side of the sensor die). Besides, these stops increase the maximum overload in two orthogonal lateral axes X and Y.

Some stops can be located inside the buried cavities. This allows better control of the maximum travel distance for the proof mass compared to the designs, in which the stops are located on the caps. Therefore, the stops in the buried cavities increase reliability of the device, increase yield, and consequently, decrease the cost of 3D accelerometer.

All basic IC components: resistors, diodes, bipolar transistors, MOS transistors can be used as stress sensors in the 3D accelerometer according to the present invention. Stress sensitivity or piezo-sensitivity of these components is related to dependence of the mobility of electrons and holes on mechanical stress in semiconductor material.

Location of the stress-sensitive components on the suspension is, preferably, chosen to maximize output signal of these stress-sensitive components by: (a) positioning them in the areas with the maximum level of stress and (b) defining angular orientation of the current flow through these components in the direction of the highest piezo-sensitivity. Besides, location of the sensors is chosen in such a way that signal of the different sensors depends differently on the direction and magnitude of acceleration vector. Therefore, all three components of acceleration vector can be determined using signals from at least three sensors.

Voltage, frequency, pulse width, current or other parameter can be used as an output signal in the three-axis MEMS accelerometer according to the present invention. Each of the sensors is characterized by an offset and its sensitivity to three independent components of acceleration vector.

Three-axis MEMS accelerometer according to present invention, preferably contains also a temperature sensor, signal-conditioning means, digital signal processing means, memory, wireless communication means, and power management means.

In general, signals of the stress sensors used in the 3D accelerometer are temperature dependent. This dependence is parasitic and its compensation increases accuracy of the accelerometer and makes its operation temperature range wider. A temperature sensor located in the same package, preferably, integrated on the 3D accelerometer die or integrated with signal conditioning means is used for compensation of temperature dependence of the output signals of the stress-sensitive sensors.

The signal conditioning means contain at least some of the following units: voltage regulator, amplifier, analog multiplexer, analog-to-digital converter (ADC), analog-to-frequency converter, oscillator, frequency-to-digital converter, pulse-width-to-digital converter (PWDC), signal filtering means, output registers for storing digital data after conversion, reference voltage circuit, and other. Circuits included in the signal conditioning means can be integrated together with the sensors on the 3D accelerometer chip or can be located on a different chip. Preferably, at least temperature sensor is integrated on the 3D accelerometer chip. Other components of signal conditioning means, for example, differential amplifiers, analog multiplexer, voltage regulator and others, also can be integrated on the sensor chip.

Digital signal processing means are used for processing of digitized data from the stress sensors. Data from the temperature sensor is also digitized and used in digital signal processing.

Memory is used to store calibration data for three-axis MEMS accelerometer. Calibration data includes at least some of the following: for each of the sensors—sensitivity to acceleration in three different directions, offsets, temperature coefficients of sensitivity, temperature coefficients of offsets, quadratic terms that determine non-linearity of sensitivity in the working acceleration range in three different directions, and other parameters used in description of the transduction characteristic of the three-axis MEMS accelerometer. Calibration data for temperature sensor includes sensitivity to temperature and offset. Calibration data is used in digital signal processing.

Both digital signal processing means and memory can be parts of the three-axis MEMS accelerometer according to present invention. Digital signal processing means and memory can be either fabricated on the three-axis accelerometer chip or on a separate chip assembled together with the accelerometer die within one package or within one device. For example, in a hand-held device digital signal from the three-axis accelerometer can be processed by one of the processors existing in the hand-held device.

The three-axis MEMS accelerometer according to present invention, preferably, contains wireless communication means. Said wireless communication means, preferably, include transmitter, receiver, antenna, modulator, demodulator, and wireless data processing means. Wireless communication means allows the three-axis MEMS accelerometer to communicate with other wireless devices like cell phones and PDAs, gaming devices, handheld computers, laptops, desktop computers, and other devices equipped with a wireless communication means. Preferably, the three-axis MEMS accelerometer according to the present invention is capable to communicate with other wireless devices through a wireless channel according to at least one of the following protocols/standards: 802.11a, b, g and others from 802.11 family, Bluetooth, 802.15.4/ZigBee and others. Wireless communication means can be placed on a separate chip or integrated on one chip with the digital signal processing means. In particular, the same processor that processes wireless data can do processing of the digitized sensor data as well. Alternatively, sensors, signal conditioning means, digital signal processing means, and wireless communication means can be integrated on the three-axis accelerometer die.

The three-axis accelerometer according to present invention, preferably, contains also power management circuit, which reduces its power consumption. This feature is beneficial when the three-axis accelerometer is used in portable devices: cell phones, gaming devices, handheld computers, etc.

Fabrication of the three-axis MEMS accelerometer requires processing of sensor wafers and cap wafers, which are necessary for adequate mechanical and environmental protection of the mechanical structure formed on the sensor wafers. Cap wafers can be either just micromachined wafers with mechanical structures or contain some electronic components.

Processing of the sensor wafers is based on a combination of IC processing step and micromachining step. IC processing step is used in fabrication of the sensors and other electronic components integrated on the sensor wafer. Stress-sensitive components like piezoresistors, MOS transistors, bipolar transistors and stress-sensitive circuits combining these components are formed in the IC processing step. In order to have stress-sensitive components with different sensitivities to all three components of the acceleration vector these stress-sensitive components should have some predetermined layout and should be formed in the predetermined locations on the substrate. Other above-discussed components and blocks integrated on the same chip with the stress-sensitive components are also fabricated in the same IC process. Components integrated with the stress sensors used in the 3D accelerometer may include other sensors, for example, temperature sensor, magnetic compass, microphone, gas sensor, etc. and IC circuits, for example, voltage regulator, differential amplifiers, analog multiplexer, clock, ADC, FDC, PWDC, registers, memory, processor, and other components. IC processing step is done before micromachining step. It is preferable to use a standard IC process, like CMOS, Bi-CMOS, bipolar process, etc. for fabricating stress-sensitive components and, when applicable, other IC components and circuits on the sensor wafers.

Micromachining step requires at least two etching operations: (1) deep micromachining from the backside of the sensor wafer and (2) etching through the device layer from the front side of the sensor wafer.

There are several micromachining process options for deep micromachining from the backside of the sensor wafer. One option requires deep dry etching another option is based on deep wet etching, and others, as combinations of the above.

Etching through the device layer is, preferably, done using dry etching. In some areas a pattern etched through the device layer opens into buried cavities formed in the initial SOI material. Wet etching of the device layer also can be used.

Proof mass element and elastic element are protected by either one or two caps connected to the frame of the sensor chip. The top cap is bonded to the front side of the sensor wafer and the bottom cap is bonded to the back side of the sensor wafer. Caps are necessary for both mechanical shock overload and environmental protection of the mechanical structure and electrical components of the three-axis accelerometer. Mechanical structure formed in the cap wafer contains at least one of the following elements: shallow air-damping recess, stops, bonding area. Top cap also has grooves that allow removing portions of the top cap wafer located above the bond pads formed on the sensor wafer, therefore, providing access to the bond pads. Bottom cap also may have grooves that allow removing portions of the bottom cap wafer after bonding. This feature can be used, for example, in multi-chip module assembly for stack wire bonding.

Wafer-level bonding of the sensor wafer with cap wafer(s) is a first level of packaging, namely, wafer-level packaging. Wafer-level packaging provides protection of the three-axis accelerometer mechanical structure on overload, mechanical contacts with surrounding objects, from contamination, moisture, etc.

All elements can vary in design and material in order to realize different aspects and advantages.

DETAILED DESCRIPTION OF THE PREFERRED EMBODIMENTS

Figure 1:
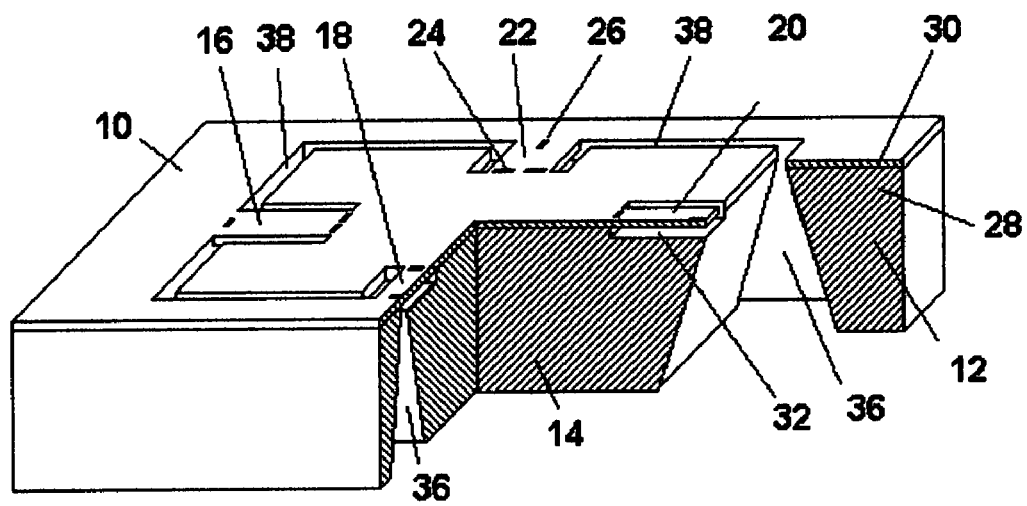
FIG. 1 shows a prior art mechanical microstructure of three-axis accelerometer sensor chip.

The cost of 3D accelerometers can be dramatically reduced by: 1) using one MEMS chip that can measure all three components of acceleration, 2) integrating signal conditioning circuits either on the same chip or on the separate chip, and 3) using low-cost packaging.

An object of the present invention is to provide a three-axis accelerometer for detecting three orthogonal components of inertial force vector with respect to an orthogonal coordinate system.

Another object of the present invention is to provide a three-axis accelerometer for high volume consumer markets like cell phones, portable gamers, digital cameras, etc.

Another object of the present invention is to provide a low cost three-axis accelerometer.

Another object of the present invention is to provide a small size three-axis accelerometer.

Another object of the present invention is to provide a high reliability three-axis accelerometer.

Another object of the present invention is to provide a three-axis accelerometer with high sensitivity to acceleration.

Another object of the present invention is to provide a three-axis accelerometer, which accommodates a required ratio between X, Y, Z sensitivities.

Another object of the present invention is to provide a three-axis accelerometer, which has low cross-axis sensitivity.

Another object of the present invention is to provide a high stability three-axis accelerometer.

Another object of the present invention is to provide a three-axis accelerometer, which allows process integration with other sensors and IC circuitry.

Another object of the present invention is to provide a 3D accelerometer, which allows process integration with standard IC processes (CMOS, Bi-CMOS, bipolar, etc.).

Another object of the present invention is to provide a three-axis accelerometer, which is scalable.

Another object of the present invention is to provide a three-axis accelerometer, which features low power consumption.

FIGS. 2-15 show various embodiments of three-axis accelerometer and die microstructures. The detailed description of the microstructures and devices according to the present invention are presented below in thirteen embodiments.

Integration of sensors, signal conditioning and processing IC circuits, and wireless communication means is the way to provide low-cost high-reliability multi-functional electronic components for different market segments. The biggest market that will benefit from these electronic components is the consumer market. Low-cost components will be integrated in hand-held devices, health and sport products, monitoring systems, toys, virtual reality devices, etc.

Today many of known multi-axis accelerometers integrate both sensor elements and IC circuits for signal conditioning and processing on the same chip. However, existing solutions do not meet cost—reliability—size requirements for consumer electronic goods. There are two key problems in existing integration of sensors and electronics: (1) large area occupied by the sensor mechanical structure at the surface of the die; (2) complexity of the process integrating IC and MEMS.

Three-axis accelerometer according to the present invention addresses these two problems. The invention provides designs that allow a significant reduction of the area, occupied by the sensor mechanical structure, at the surface of the die. The fabrication process of invented accelerometer is simple and fully compatible with any standard IC fabrication processes including CMOS, Bi-CMOS, bipolar process and others. Besides decreasing size and cost, the present invention also provides higher sensitivity, resolution, and reliability of three-axis accelerometer.

Figure 2:
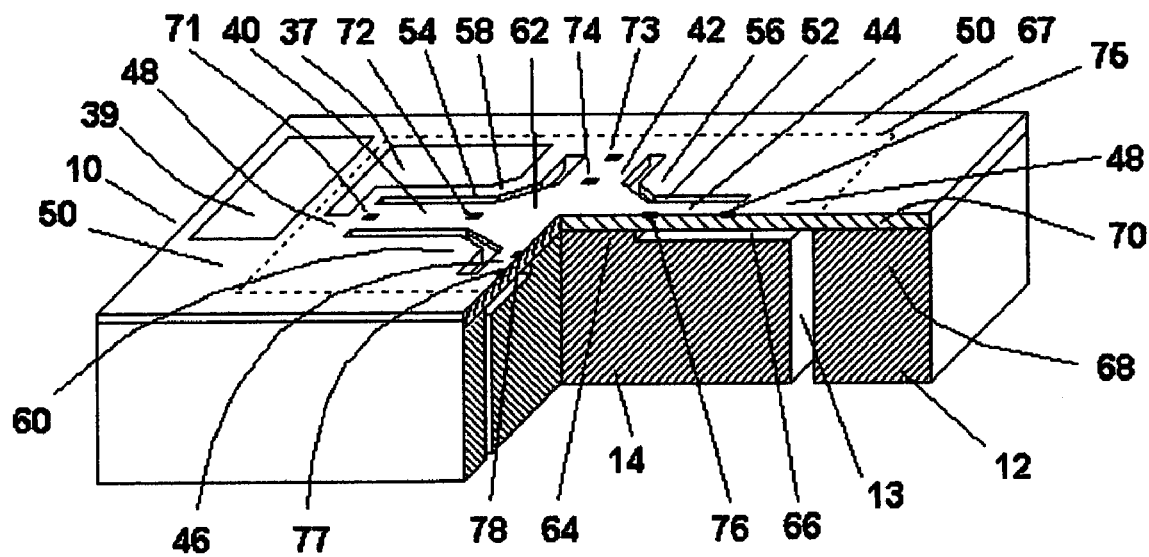
FIG. 2 shows mechanical microstructure of three-axis accelerometer with buried cavity located in the handle wafer and the elastic element defined by the openings in the device layer according to the second embodiment of the present invention.

The first alternate preferred embodiment of the present invention provides a three-axis accelerometer having one or more of the following elements or means:

- a semiconductor substrate consisting of layer 1 and layer 2 of semiconductor materials attached to each other; the semiconductor substrate has at least one cavity at the interface between the layer 1 and the layer 2;
- a semiconductor substrate comprised of material chosen from the group consisting essentially of: elements from the IV group of the Periodic Table, silicon, germanium, silicon-germanium, silicon carbide, silicon on sapphire, carbon, diamond-like carbon, elements from III and V groups of the Periodic Table, gallium arsenide, gallium nitride, indium phosphide.
- a sensor die made of a semiconductor substrate and having side 1 and opposite side 2;
- a frame element having thickness being a part of the sensor die;
- a proof mass having length, width and thickness being a part of the sensor die
- a frame element consisting of part 1 having thickness and part 2 having uniform thickness smaller than thickness of the part 1 and surrounded by part 1;
- an elastic element being a part of the sensor die mechanically connecting the frame and the proof mass; on side 1, wherein an inertial force applied to the proof mass induces stress in the elastic element; said elastic element has length, width and thickness;
- an elastic element having at least two portions of different thickness;
- an elastic element having at least one through opening in its thickness dimension;
- an elastic element having the shape chosen from the group shapes consisting essentially of: ring, perforated ring, n-sided faceted geometry, beams, tethers, springs and combination of these shapes;
- an elastic element having at least one stress-concentrating element having a shape selected from a group of shapes consisting essentially of: a V-groove, a groove having a trapezoidal cross section, a groove having the sidewalls forming an angle in the range of 90°±5° with the surface of the elastic element, a pyramid, a prism, a ridge, a rim, a boss, a mesa, and combination of these shapes;
- at least one cap chip having thickness and mechanically coupled to the frame element from at least the side 2 of the sensor die;
- a proof mass having at least two dimensions out of length, width and thickness bigger than the corresponding dimensions of the elastic element;
- a proof mass having a bigger thickness than thickness of the frame and a smaller thickness than the combined thickness of the frame and the cap connected to the side 2 of the sensor die;
- a proof mass having a center of rotation;
- stress-sensitive IC components integrated into the elastic element; each of the stress-sensitive IC components generates a signal in response to the stress in the elastic element;
- stress-sensitive IC components chosen from the group of stress sensitive IC components consisting essentially of: a piezoresistor, a p-n junction, a tunnel diode, a Schottky diode, a shear stress component, a piezoresistive Wheatstone bridge, a MOS transistor, a complementary pair of CMOS transistors, a bipolar transistor, a pair of p-n-p and n-p-n bipolar transistors, a bipolar transistor and at least one piezoresistor connected to transistor, a MOS transistor and at least one piezoresistor connected to transistor, a bipolar transistor circuit, and a CMOS transistor circuit.
- at least one electronic circuit coupled to the three-axis accelerometer;
- at least one electronic circuit integrated within the part 2 of the sensor die frame;
- at least one electronic circuit integrated within the proof mass element of the sensor die;
- at least one electronic circuit providing one or more functions from a group of functions consisting of: voltage regulation, providing reference signals, analog amplifying, analog multiplexing, signal filtering, analog-to-digital conversion, signal processing, voltage stabilization, current stabilization, memory for compensation coefficients, temperature compensation, digital interface, power management, transmitting and receiving radio-signals, and management of charging from piezoelectric elements;
- at least one electronic circuit comprising sensor components chosen from the group of sensors consisting of: temperature sensor, magnetic sensor, radiation sensor, optical sensor, image sensor, humidity sensor, chemical sensor, pressure sensor, tactile sensor, force sensor, acoustic sensor, angular rate sensor, mass flow sensor.
- a package or substrate providing integration of two, more than two or all the subcomponents, components or elements of the three-axis accelerometer;
- an electronic circuit for processing output signals from the mechanical stress-sensitive components and providing the separation of the three-dimensional output signals in either Cartesian or spherical system of coordinate;
- at least four mechanical stops having contact area and characterized by a specific sticking force per unit area originating within a contact area between a contact surface of stops and a contact surface of the other parts of accelerometer at the moment of contact; the at least four mechanical stops: (a) limit linear and angular displacements of a proof mass element caused by inertial force applied in any direction; (b) have contacting area smaller than the ratio of the restoring force at the moment of contact to the specific sticking force; and (c) have the distance between the contact surface of stops and a contact surface of the other parts of accelerometer greater than the displacement of the proof mass corresponding to the range of measurement plus the additional displacement of the proof mass creating the restoring force greater than the specific sticking force multiplied by the contact area of the stops and smaller than the displacement of the proof mass corresponding to the critical mechanical stress in the elastic element.

mechanical stops located at the elements of the sensor microstructure chosen from the group consisting essentially of: the cap mechanically coupled to the frame element from side 2 of the sensor chip; the cap mechanically coupled to the frame element from side 1 of the sensor chip; proof mass; proof mass from side 2 of the sensor chip; proof mass from side 1 of the sensor chip; part 2 of the frame; part 1 of the frame; elastic element.

stops located at such a distance from the center of rotation of the proof mass, which provides the maximum stress in the elastic element at the moment of contact with stops, as a result of forward displacement of the proof mass, equal to the maximum stress in the elastic element at the moment of contact with stops, as a result of rotational displacement of the proof mass under an applied inertial force exceeding the measurement range.

stops located at such a distance from the center of rotation of the proof mass, which provides restoring force in the elastic element at the moment of contact with stops, as a result of forward displacement of the proof mass, equal to the restoring force in the elastic element at the moment of contact with stops, as a result of rotational displacement of the proof mass under an applied inertial force exceeding the measurement range.

at least one mechanical stop, which limits deflection of the proof mass caused by an inertial force applied in either of at least two orthogonal directions.

at least one mechanical stop consisting of two parts of different height, part 1 and part 2, where part 1 limits displacement of the proof mass element under applied inertial force exceeding the measurement range in lateral X or Y directions and part 2 limits displacement of the proof mass element under applied inertial force exceeding the measurement range in normal Z direction.

at least one mechanical stop located within a cavity formed at the interface between layer 1 and layer 2 and inside a through-hole in the frame element and having the shape chosen from the group of shapes consisting of: mesa, pole, boss, cylinder, prism, ridge, comb structure and combinations of these shapes.

at least one mechanical stop consisting of two parts of different height: part 1 and part 2; part 2 of which has the shape chosen from the group of shapes consisting essentially of: mesa, pole, boss, lug, cylinder, ridge, rim and combinations of these shapes.

stress-sensitive components using highly-doped Si layers (p+ or n+) or highly-doped poly-silicon layers (also p+ or n+) for connection with the metal lines located in the frame area only.

stress-sensitive components having low sensitivity of electrical parameters and sensitivity to misalignment due to its layout;

stress-sensitive components on (100) silicon wafers utilizing p-type piezoresistors oriented along [110] family crystallographic directions and perpendicular to each other;

a temperature sensor located on the frame of the sensor chip in a stress-free area;

a temperature sensor based on p-n junction;

a temperature sensor based on a resistive divider formed with resistors having substantially different thermal coefficient of resistance (TCR);

a circuit for providing a reference signal that is close to the middle point of the voltage range available for the three-axis accelerometer;

a circuit for providing a reference signal based on a resistive divider;

a circuit where output signal of the temperature sensor is measured with respect to a reference signal;

a circuit where the same reference signal is used in measurements of output signals of all stress-sensitive components;

a circuit where the same reference signal is used in measurements of output signals of all stress-sensitive components and all other sensors;

FIG. 2 shows mechanical structure of threeaxis accelerometer for determining components of an inertial force vector with respect to an orthogonal coordinate system according to the second embodiment. The sensor die 10 has side 1 and an opposite side 2 in the plane of a semiconductor substrate. The coordinate system (X, Y, Z axes) is chosen such that X and Y axes are located in the plane of side 1 and parallel to the sidewalls of the chip. The Z-axis is perpendicular to side 1 and the origin is located in the projection of a center of gravity of the proof mass onto the side 1. Each of X, Y, Z dimensions of the proof mass is defined as maximum difference between corresponding coordinates of any two points of the proof mass. The sensor die 10 is fabricated on a semiconductor substrate of SOI type having handle layer 68 and device layer 70. A buried cavity 66, or in general a set of cavities, is formed in the handle layer 68 at the interface of the handle and device layers. Mechanical structure of the three-axis accelerometer consists of a frame, a proof mass 14 and an elastic element or suspension in the form of four beams 40, 42, 44, and 46. The frame has a thick portion 12 and a thin portion 48 having uniform thickness. The proof mass is separated from the thick portion 12 of the frame by a slot 13 and from the thin portion 48 of the frame by the buried cavity 66. Each of the four beams forming the elastic element has one end connected to the proof mass 14 in the connection area 62. The other end of each of the four beams is connected to the thin portion 48 of the frame. Beams 40, 42, 44, and 46 are separated from the thin portion 48 of the frame with slots 52, 54. Stress-sensitive components 71, 72, 73, 74, 75, 76, 77, and 78 are located on the four beams 40, 42, 44, and 44. Elastic element, as a totality of four beams 40, 42, 44, and 46, has overall X and Y dimensions in the plane of the semiconductor substrate and has thickness (Z dimension). Each of X, Y, Z overall dimensions of the elastic element is defined as maximum difference between corresponding coordinates of any two points of the elastic element. The set of cavities has overall X and Y dimensions in the plane of the semiconductor substrate. Each of X, Y overall dimensions of the set of cavities is defined as maximum difference between corresponding coordinates of any two points of the set of cavities. Cavity 66 or set of cavities has a projection with external boundary 67 on the plane of side 1 of the sensor die 10. All components of the elastic element are located within the projection of the set of cavities on the plane of side 1.

When the proof mass 14 is loaded by an inertial force (gravity force and/or acceleration) it tends to move. Displacement of the proof mass 14 creates stress in the beams 40, 42, 44, and 46. This stress generates electrical signals in the stress-sensitive components 71-78.

Mechanical design of the elastic element and the proof mass 14, location and orientation of the stress-sensitive components 71-78 with respect to crystal axes of the semiconductor substrate guarantee that sensitivities of the stress-sensitive components allows determination of all three components of the inertial force vector.

Mechanical stiffness of the thin portion 48 of the frame is significantly higher than the combined mechanical stiffness of the four beams 40, 42, 44, and 46 forming the elastic element. Therefore, the maximum stress in the thin portion 48 of the frame is orders of magnitude smaller than the maximum stress in the beams 40, 42, 44, and 46. In particular, areas 56, 58, and 60 are isolated from the suspension by slots 52, 54, and therefore, are practically stress-free. These and other areas on the thin portion 48 of the frame are suitable for different types of IC components and circuits 37, as shown in FIG. 2. It is obvious that integrated circuits 39 can be also integrated on the area 50 of the thick part of the frame.

As it can be seen from FIG. 2, the overall size of the cavity 66 with the boundary 67 is larger than the overall size of the elastic element (beams 40, 42, 44, and 46) and the size of the proof mass 14 is also larger than size of the elastic element in all three dimensions. The design described in this embodiment provides a proof mass, which has all three overall dimensions larger than corresponding dimensions of the elastic element (beams 40, 42, 44, and 46).

The invented three-axis accelerometer according to the second embodiment has many benefits. First of all, it allows sensitivity increase. Sensitivity of the three-axis accelerometer is directly proportional to value of the proof mass and inversely proportional to the stiffness of the suspension. In the design described in the second embodiment the size of the proof mass is limited only by the required minimum width of the thick portion 12 of the frame and width of the gap 13 between the proof mass 14 and thick portion 12 of the frame. The minimum width of the thick portion 12 of the frame is determined by its mechanical strength that should be sufficient for wafer processing, including dicing, and die processing. For the same size of the die, the three-axis accelerometer according to the second embodiment provides significantly larger size of the proof mass 14 and significantly higher sensitivity to acceleration in comparison with the three-axis accelerometers known in the prior art.

Second, increase of proof mass allows making suspension stronger while keeping the same level of the output signal or even increasing it. Suspension can be made stronger by making it thicker. Using thicker suspension allows better control of its thickness and, therefore, increases reproducibility of the three-axis accelerometer parameters and yield in its manufacturing.

Third, increase of the proof mass allows reducing area occupied by the elastic element or suspension. In particular, length of the beams 40, 42, 44, and 46 can be made smaller—this is another way of making the suspension stronger. As a result, the area available for IC circuitry on the three-axis accelerometer die increases and this allows either reducing size of the sensor die 10 or integrating additional electronic circuits on the sensor die 10 of the same size.

Fourth, increased proof mass and increased sensitivity of the stress-sensors improves signal-to-noise ratio of the three-axis accelerometer which makes dynamic range of the device wider and resolution better.

Fifth, increased sensitivity of the three-axis accelerometer allows simplification of signal conditioning (signal amplification, compensation, conversion to digital form, etc.). This leads to certain power savings, simplification of the signal conditioning electronics, and reduction of the area occupied by the signal conditioning electronics on the chip, which in turn allows die size reduction and three-axis accelerometer cost reduction.

Figure 3:
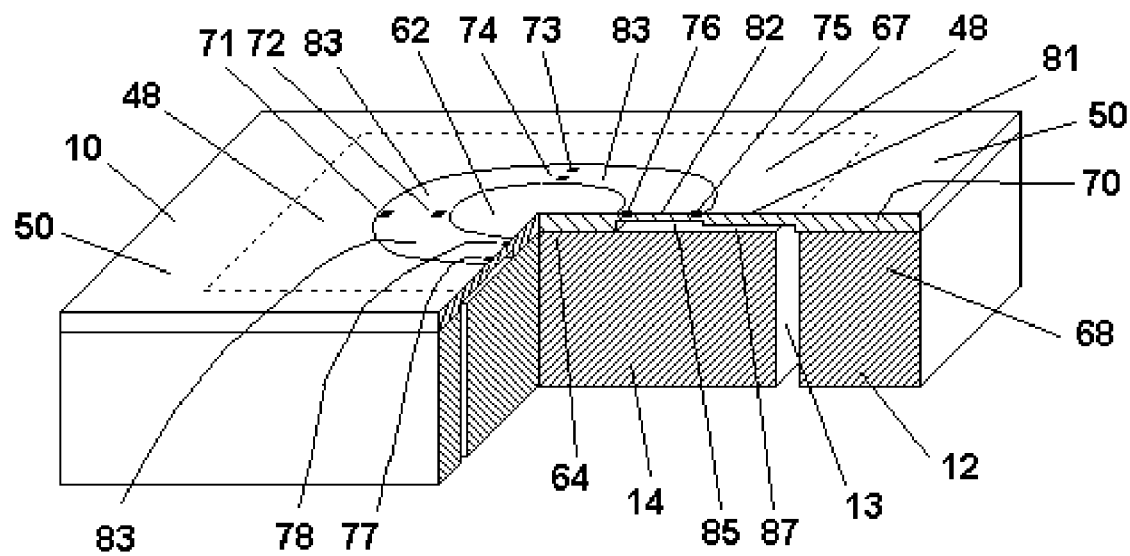
FIG. 3 shows mechanical microstructure of three-axis accelerometer with profiled buried cavity located in the device layer according to the third embodiment of the present invention.
Figure 4:
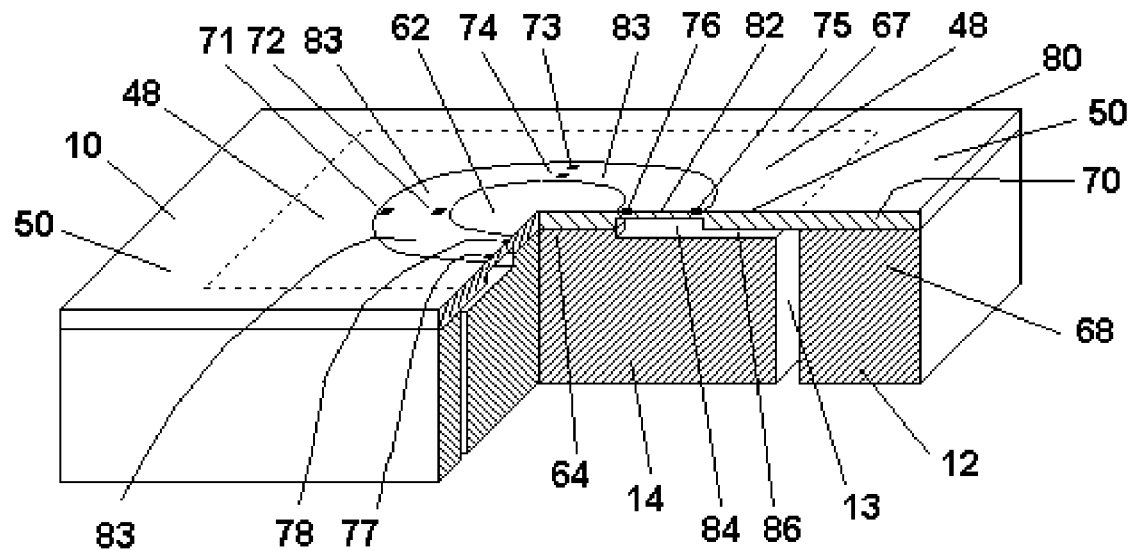
FIG. 4 shows mechanical microstructure of three-axis accelerometer with buried cavity located in both the handle wafer and device layer and the elastic element defined by profiling the device layer according to the third embodiment of the present invention.

FIG. 3 and FIG. 4 show mechanical structures of three-axis accelerometer according to the third embodiment.

The sensor die 10 of three-axis accelerometer shown in FIG. 3 is fabricated on a semiconductor substrate of SOI type having handle layer 68 and device layer 70. A buried cavity 85, 87 are located in the device layer 70 at the interface of the handle and device layers. Mechanical structure of the three-axis accelerometer consists of a frame, a proof mass 14 and an elastic element In the form of an annular diaphragm 83. The frame has a thick portion 12 and a thin portion 48 having uniform thickness. The proof mass, being located within the thickness of SOI semiconductor substrate, is separated from the thick portion 12 of the frame by a slot 13, from the thin portion 48 of the frame by the buried cavity 87, and from the elastic element 82, 83 by the buried cavity 85. The annular diaphragm 83 is connected to the thin portion 48 of the frame on its outer edge and to the proof mass 14 at its inner edge. Alternatively, the elastic element can be formed as a set of beams (similar to the structure described in the second embodiment), thickness of which is smaller than thickness of the thin portion 48 of the frame. Stress-sensitive components 71, 72, 73, 74, 75, 76, 77, and 78 are located on the annular diaphragm 83.

FIG. 4 shows an alternative design of sensor die 10 according to the third embodiment. The sensor die 10 is fabricated on a semiconductor substrate of SOI type having handle layer 68 and device layer 70. A buried cavity 84, 86 is formed at the interface of the handle and device layers. In comparison with the structure shown in FIG. 3, one portion 86 of the buried cavity is located in the handle layer 68 and the other portion 84 of the buried cavity is located in the device layer 70. Mechanical structure of the three-axis accelerometer consists of a frame, a proof mass 14 and an elastic element in the form of an annular diaphragm 83. The frame has a thick portion 12 and a thin portion 48 having uniform thickness. The proof mass is separated from the thick portion 12 of the frame by a slot 13 and from the thin portion 48 of the frame by the buried cavity 84, 86. The annular diaphragm 83 is connected to the thin portion 48 of the frame on its outer edge and to the proof mass 14 at its inner edge. Alternatively, the elastic element can be formed as a set of beams, thickness of which is smaller than thickness of the thin portion 48 of the frame. Stress-sensitive components 71, 72, 73, 74, 75, 76, 77, and 78 are located on the annular diaphragm 83.

When the proof mass 14 is loaded by an inertial force (gravity force and/or acceleration), it tends to move. Displacement of the proof mass 14 creates stress in the annular diaphragm 83. This stress generates electrical signals in the stress-sensitive components 71-78.

Mechanical design of the elastic element and the proof mass 14, location and orientation of the stress-sensitive components 71-78 with respect to crystal axes of the semiconductor substrate guarantee that sensitivities of the stress-sensitive components allows determination of all three components of the inertial force vector.

Mechanical stiffness of the thin portion 48 of the frame is significantly higher than that of the annular diaphragm 83. Therefore, the maximum stress in the thin portion of the frame is orders of magnitude smaller than the maximum stress in the elastic element 83. Different types of IC components and circuits can be fabricated on the thin portion 48 of the frame.

As it can be seen from FIGS. 3 and 4, the overall size of the cavity 85, 87 (FIG. 3) and 84,86 (FIG. 4) with the boundary 67 is larger than the overall size of the elastic element 83 and the size of the proof mass 14 is larger than size of the diaphragm elastic element 83 in all three dimensions. The diaphragm elastic element 83 allows simplification of the process (no need to etch through the diaphragm) and better environmental protection of the structure. In some cases three-axis accelerometer with diaphragm elastic element 83 can be used without the top cap. All this reduces cost and height of the three-axis accelerometer die making it suitable for wider variety of applications.

Therefore, the main advantages of the device presented in FIGS. 3 and 4 are: (a) significantly higher sensitivity due to using of the proof mass 14 having size bigger than the size of elastic element 83 in all three dimensions; (b) utilization of the areas above the proof mass on the thin part 48 of the frame for IC components and circuits; and (c) solid diaphragm elastic element, which allows using only one cap attached to the handle layer 68 of the sensor die.

Figure 5:
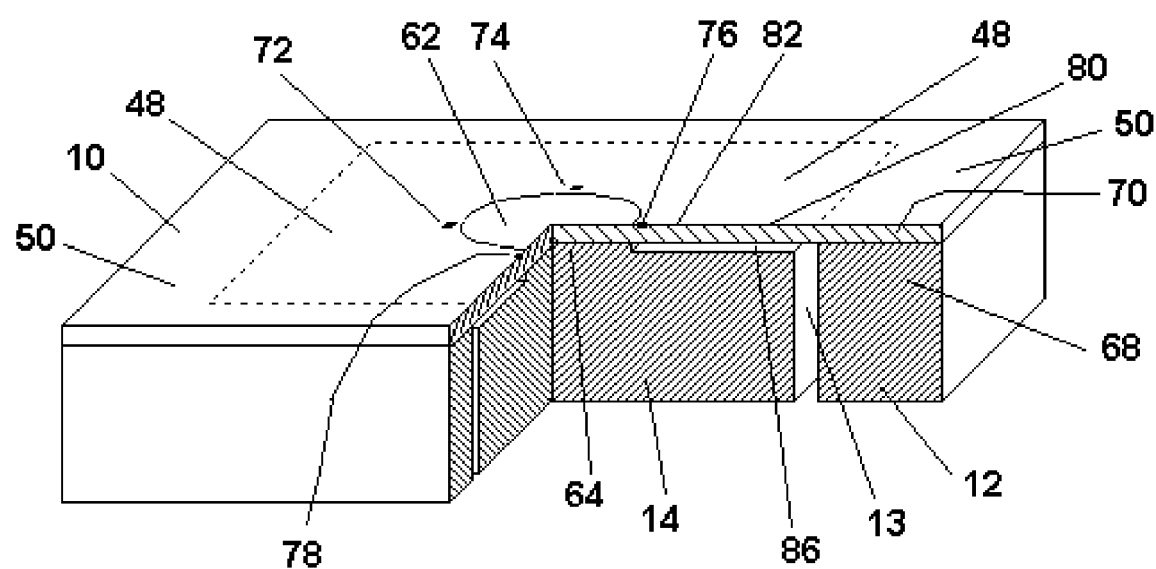
FIG. 5 shows mechanical microstructure of three-axis accelerometer with buried cavity located in the handle wafer according to the fourth embodiment of the present invention.

FIG. 5 shows mechanical structure of three-axis accelerometer according to the fourth embodiment. The sensor die 10 is fabricated on a semiconductor substrate of SOI type having handle layer 68 and device layer 70. A buried cavity 86 is formed at the interface of the handle and device layers. Mechanical structure of the three-axis accelerometer consists of a frame, a proof mass 14 and an elastic element in the form of a portion 82 of diaphragm 80. The frame has a thick portion 12 and a thin portion 48 having uniform thickness. The proof mass 14 is separated from the thick portion 12 of the frame by a slot 13 and from the thin portion 48 of the frame by the buried cavity 86. Stress-sensitive components 72, 74, and 76 are located on the elastic element 82.

The improvement made to the three-axis accelerometer according to the fourth embodiment is related to simplification of the structure and as a result of that decrease of its cost.

As it can be seen from FIG. 5, the proof mass is suspended in the center 62 of the uniform diaphragm. When an inertial force is applied to the proof mass 14, the largest deformations and stresses occur in the area 82 of the elastic element adjacent to the central area 62. The peripheral areas of the diaphragm 80, which belongs to the thin potion 48 of the frame and central area 62 are almost stress-free and suitable for placing IC components and circuits. Although there is no clear boundary between the elastic element 82 and thin portion of the frame 48 in the structure, the distinguishing factor is the maximum level of stress caused by a maximum inertial force applied to the 3D accelerometer, which makes the area 82 of elastic element suitable for stress-sensitive components and area 48 of the frame suitable for IC components and circuits in addition to the area 50 of the thicker portion of the frame.

Fabrication of three-axis accelerometer according to the fourth embodiment does not require any micromachining of the device layer of SOI wafer. The only micromachining step is a deep backside etching through the handle layer to release the proof mass 14. This makes process integration in fabrication of the three-axis accelerometer simple and low-cost, which is one of the most important requirements for transferring these advanced three-axis accelerometers in high-volume production.

Therefore, the main advantages of the device presented in FIG. 5 are: (a) significantly higher sensitivity due to using of the proof mass 14 having size bigger than the size of elastic element 82 in all three dimensions; (b) utilization of the areas above the proof mass 14 on the thin part 48 of the frame for IC components and circuits; and (c) solid diaphragm elastic element, which allows using only one cap attached to the handle layer 68 of the sensor die.

The next group of four embodiments illustrated by FIGS. 6-9 describes advantages of the technical solutions according to the present invention by significant decrease of the sensor size on the surface of the die and therefore, effectively utilizing area on the top surface of the wafer for integration with electronic circuits.

Figure 6:
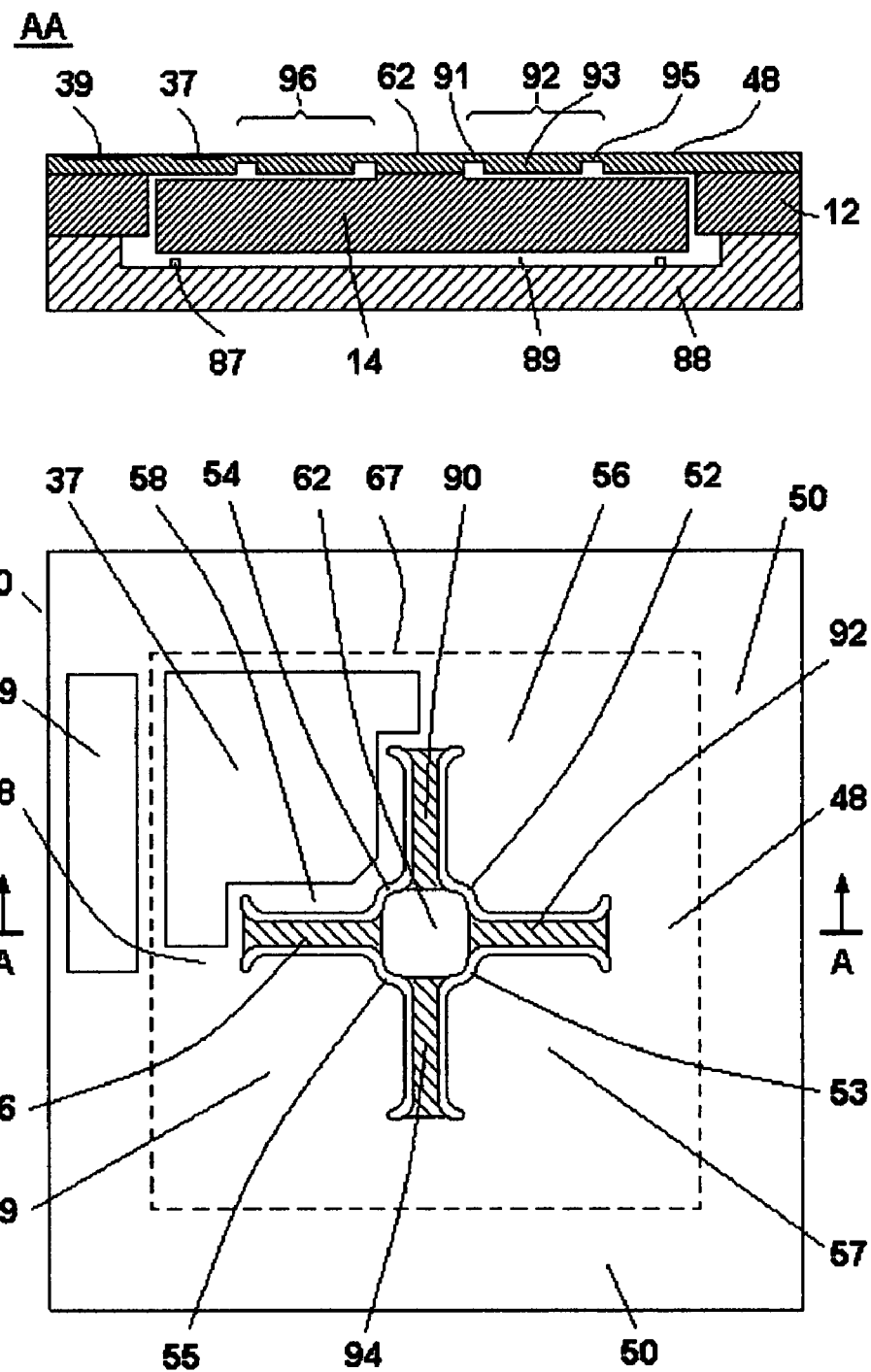
FIG. 6 shows mechanical microstructure of a three-axis accelerometer with extended area of the thin part of the frame for IC integration according to the fifth embodiment of the present invention.

FIG. 6 shows mechanical structure of the three-axis accelerometer according to the fifth embodiment. Mechanical structure of the three-axis accelerometer consists of a frame, a proof mass 14 and an elastic element or suspension in the form of four beams 90, 92, 94, and 96. The beams can have either uniform thickness or have at least two portions of different thickness, as shown in FIG. 6. For example, beam 92 has thin portion 91, 95 and thick portion 93. Combination of thin and thick portions of the beam can create stress concentrating elements. as shown in FIG. 6 In the form of grooves below thin parts 91 and 95 of the beam 92. The stress concentrating elements might have different shapes: V-groove, trapezoidal groove, a groove with the sidewalls forming an angle in the range of 85 degrees to 95 degrees with the surface of the elastic element, pyramid, prism, ridge, rim, boss, mesa and combinations of these shapes. The frame has a thick portion 12 and a thin portion 48 having uniform thickness. One end of each of the beams 90, 92, 94, 96 is connected to the proof mass 14 at the periphery of the central area 62. The other end of each of the beams is connected to the thin part 48 of the frame. The beams are separated from the thin part 48 of the frame by slots 52, 53, 54 and 55. Three-axis accelerometer further has a bottom cap 88 connected to the thick portion of the frame 12. The proof mass 14 has a thickness larger than the thickness of the thick portion of the frame 12 but smaller than the combined thickness of the thick portion of the frame and the cap 88 coupled to the frame 12 of the sensor die. The proof mass is separated from the bottom cap by the gap 89. The bottom cap has special mechanical structures—stops 87. Stops limit travel distance of the proof mass 14 in different directions in case of shock overload protecting the elastic element from breakage.

During the operation of three-axis accelerometer the mechanical stress occurs only in the beams 90, 92, 94, and 96. All other areas are practically stress-free and can be used for IC components. In particular, the areas suitable for IC components include: (1) top surface 50 of the thick portion 12 of the frame, as shown by circuit 39; (2) thin portion 48 of the frame located above the proof mass, including areas 56, 57, 58, and 59 separated from the beams 90, 92, 94, and 96 by the slots 52, 53, 54, 55; and (3) central portion of the proof mass 62. As it can be seen from FIG. 6, using thin portion 48 and 58 of the frame for placement of electronic components 37 provides a very significant increase in the area available for IC circuitry on the three-axis accelerometer die in comparison with the known in the prior art devices. This allows either reducing size of the sensor die 10 or integrating additional electronic circuits on the sensor die 10 of the same size. Reducing size of the three-axis accelerometer die reduces its cost. Integrating additional electronics on the sensor die 10 of the same size adds functionality and value to the device without affecting its cost. In both cases it makes three-axis accelerometer according to the present invention more attractive for high-volume applications.

Figure 7:
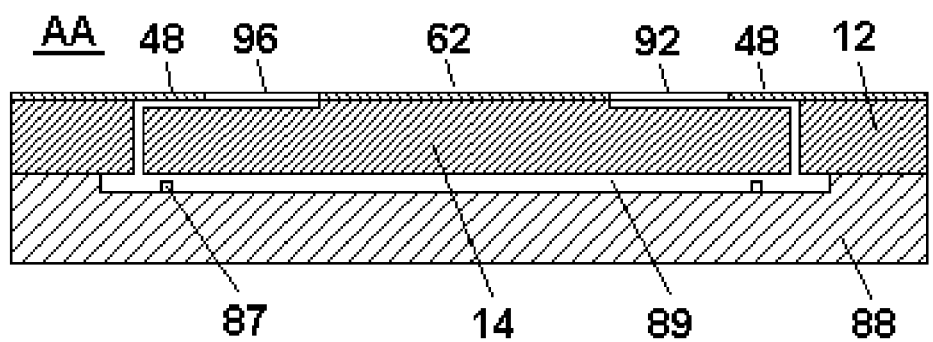
FIG. 7 shows mechanical microstructure of a three-axis accelerometer with extended area on the top surface of the proof mass for IC integration according to the sixth embodiment of the present invention.
Figure 7:
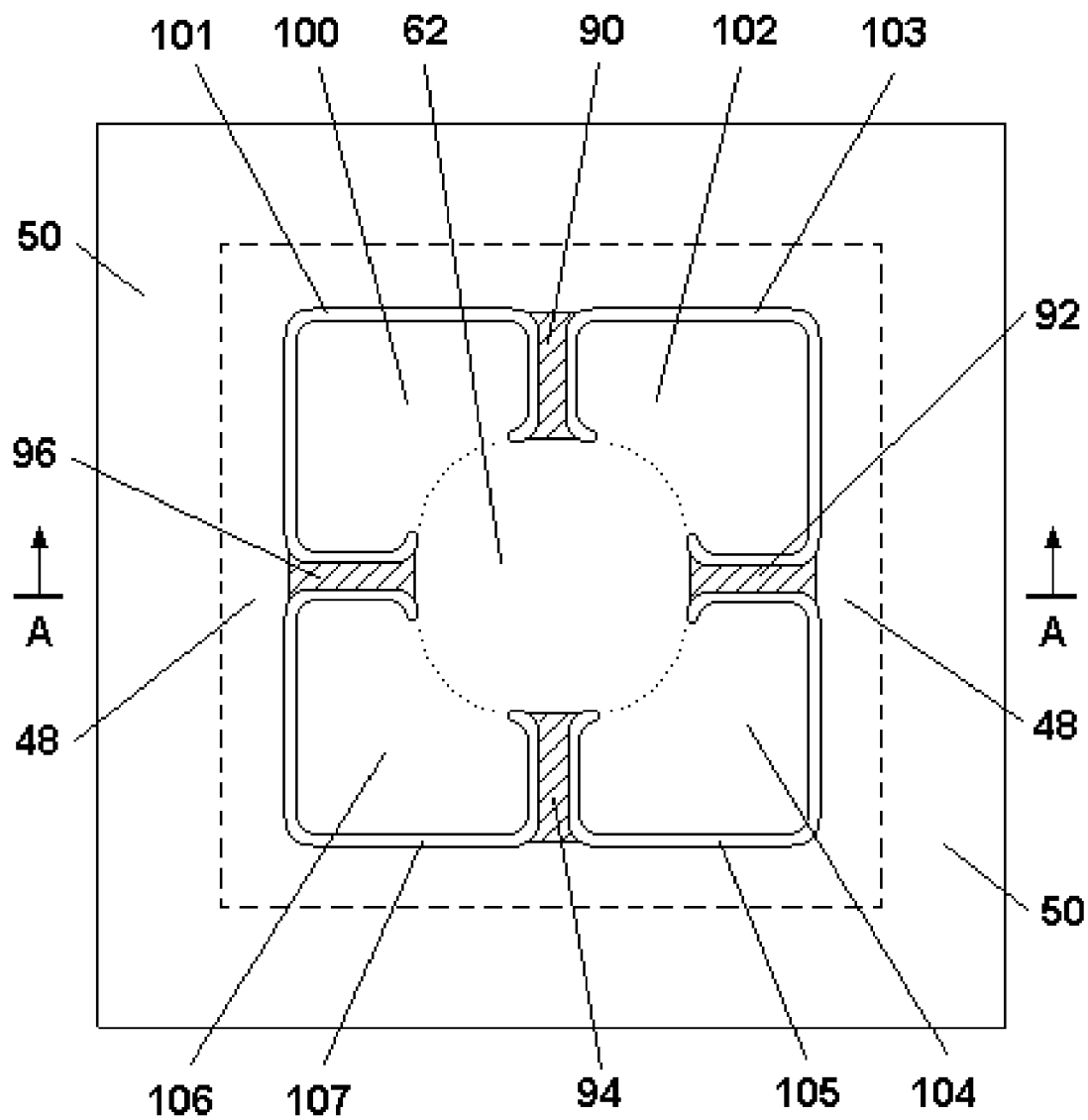

FIG. 7 shows mechanical structure of three-axis accelerometer according to the sixth embodiment. Mechanical structure of the three-axis accelerometer consists of a frame, a proof mass 14 and an elastic element or suspension in the form of four beams 90, 92, 94, and 96. The frame has a thick portion 12 and a thin portion 48 having uniform thickness. One end of each of the beams 90, 92, 94, 96 is connected to the proof mass 14 at the periphery of the central area 62. The other end of each of the beams is connected to the thin part 48 of the frame. The beams are separated from the thin part 48 of the frame by slots 101, 103, 105, and 107. Three-axis accelerometer further has a bottom cap 88 connected to the thick portion of the frame 12. The proof mass is separated from the bottom cap by the gap 89. The bottom cap has special mechanical structures—stops 87. Stops limit travel distance of the proof mass in different directions in case of shock overload protecting the elastic element from breakage.

Only beams 90, 92, 94, and 96 are loaded with mechanical stress during operation of the three-axis accelerometer. All other areas are practically stress-free and can be used for placement of IC components. In particular, the areas suitable for placement of IC components are: (1) top surface 50 of the thick portion 12 of the frame; (2) thin portion 48 of the frame located above the proof mass; and (3) top portion of the proof mass, including, central area 62 and areas 100, 102, 104, and 106 separated from the beams 90, 92, 94, and 96 by the slots 101, 103, 105, and 107. As it can be seen from FIG. 7, using thin portion 48 of the frame and top surface of the proof mass the for placement of electronic components provides a very significant increase in the area available for IC circuitry on the three-axis accelerometer die in comparison with the known in the prior art devices. This allows either reducing size of the sensor die 10 or integrating additional electronic circuits on the sensor die 10 of the same size. Reducing size of the three-axis accelerometer die reduces its cost. Integrating additional electronics on the sensor die 10 of the same size adds functionality and value to the device without affecting the cost. In both cases it makes three-axis accelerometer according to the present invention more attractive for high-volume applications.

Figure 8:
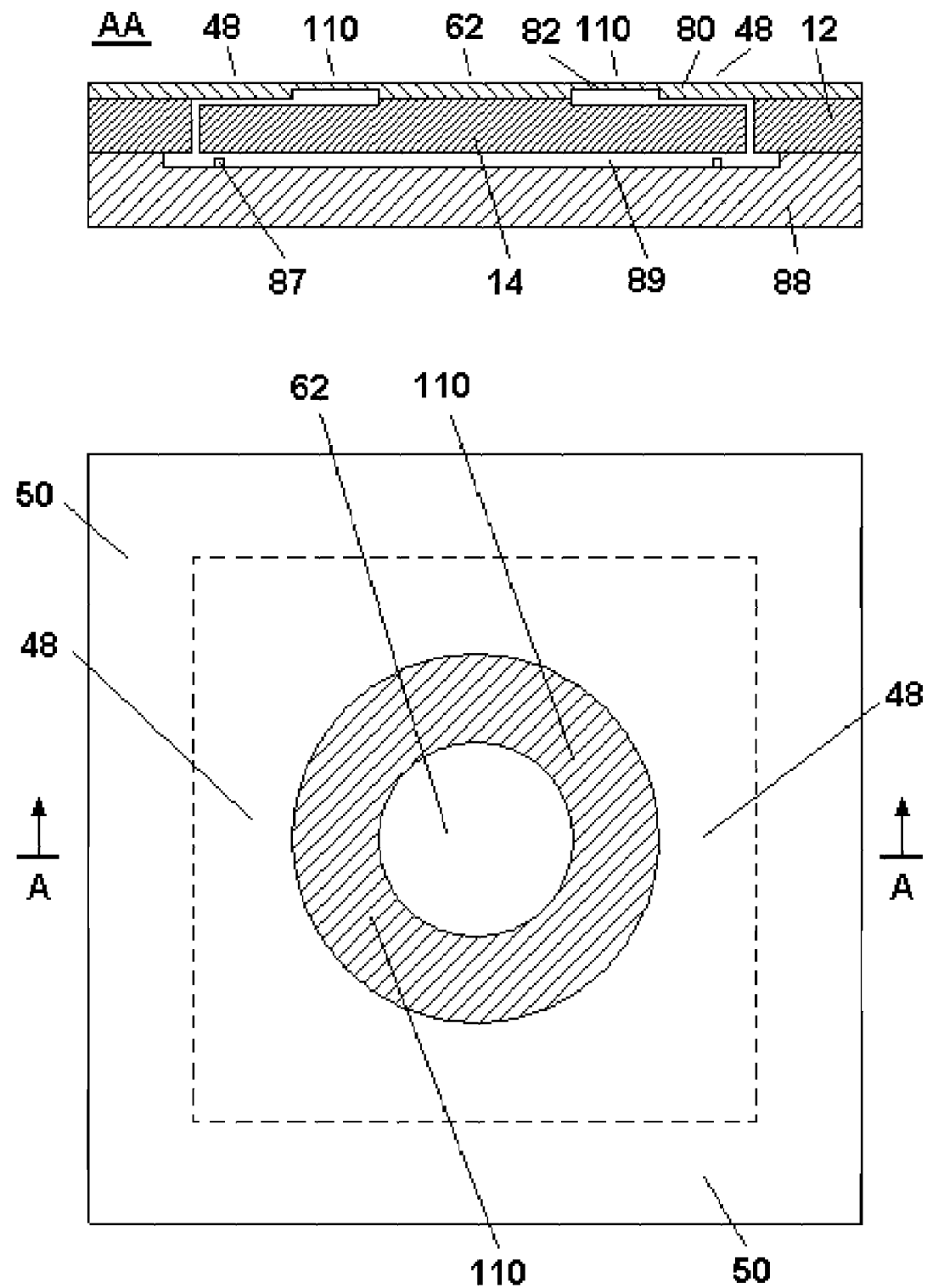
FIG. 8 shows mechanical microstructure of a three-axis accelerometer with an annular diaphragm as an elastic element profiled in the device layer according to the seventh embodiment of the present invention.

FIG. 8 shows mechanical structure of three-axis accelerometer according to the seventh embodiment. Mechanical structure of the three-axis accelerometer consists of a frame, a proof mass 14 and an elastic element in the form of an annular diaphragm 110. The frame has a thick portion 12 and a thin portion 48 having uniform thickness. One side of the annular diaphragm 110 is connected to the proof mass 14 at the periphery of the central area 62. The other side of the annular diaphragm 110 is connected to the thin part 48 of the frame. Three-axis accelerometer further has a bottom cap 88 connected to the thick portion of the frame 12. The proof mass is separated from the bottom cap by the gap 89. The bottom cap has special mechanical structures—stops 87. Stops limit travel distance of the proof mass in different directions providing protection of the mechanical structure in case of shock overload.

Only annular diaphragm 110 is loaded with mechanical stress during operation of the three-axis accelerometer. All other areas are practically stress-free and can be used for placement of IC components. In particular, the areas suitable for placement of IC components include: (1) top surface 50 of the thick portion 12 of the frame; (2) thin portion 48 of the frame located above the proof mass 14; and (3) top portion 62 of the proof mass inside the annular diaphragm 110. As it can be seen from FIG. 8, using the thin portion 48 of the frame and top surface 62 of the proof mass 14 the for placement of electronic components provides a very significant increase in the area available for IC circuitry on the three-axis accelerometer die in comparison with the known in the prior art devices. This allows either reducing size of the sensor die 10 or integrating additional electronic circuits on the sensor die 10 of the same size. Reducing size of the three-axis accelerometer die reduces its cost. Integrating additional electronics on the sensor die 10 of the same size adds functionality and value to the device without affecting the cost. In both cases it makes three-axis accelerometer according to the present invention more attractive for high-volume applications.

Figure 9:
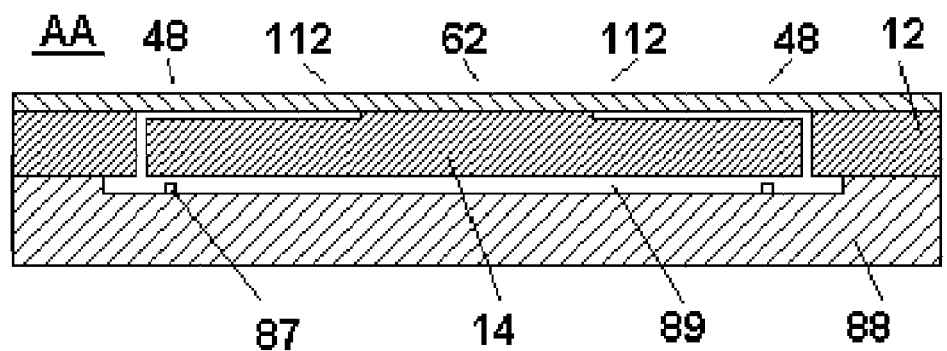
FIG. 9 shows mechanical microstructure of a three-axis accelerometer with a uniform rectangular diaphragm, as both an elastic element and an area for IC integration according to the eighth embodiment of the present invention.
Figure 9:
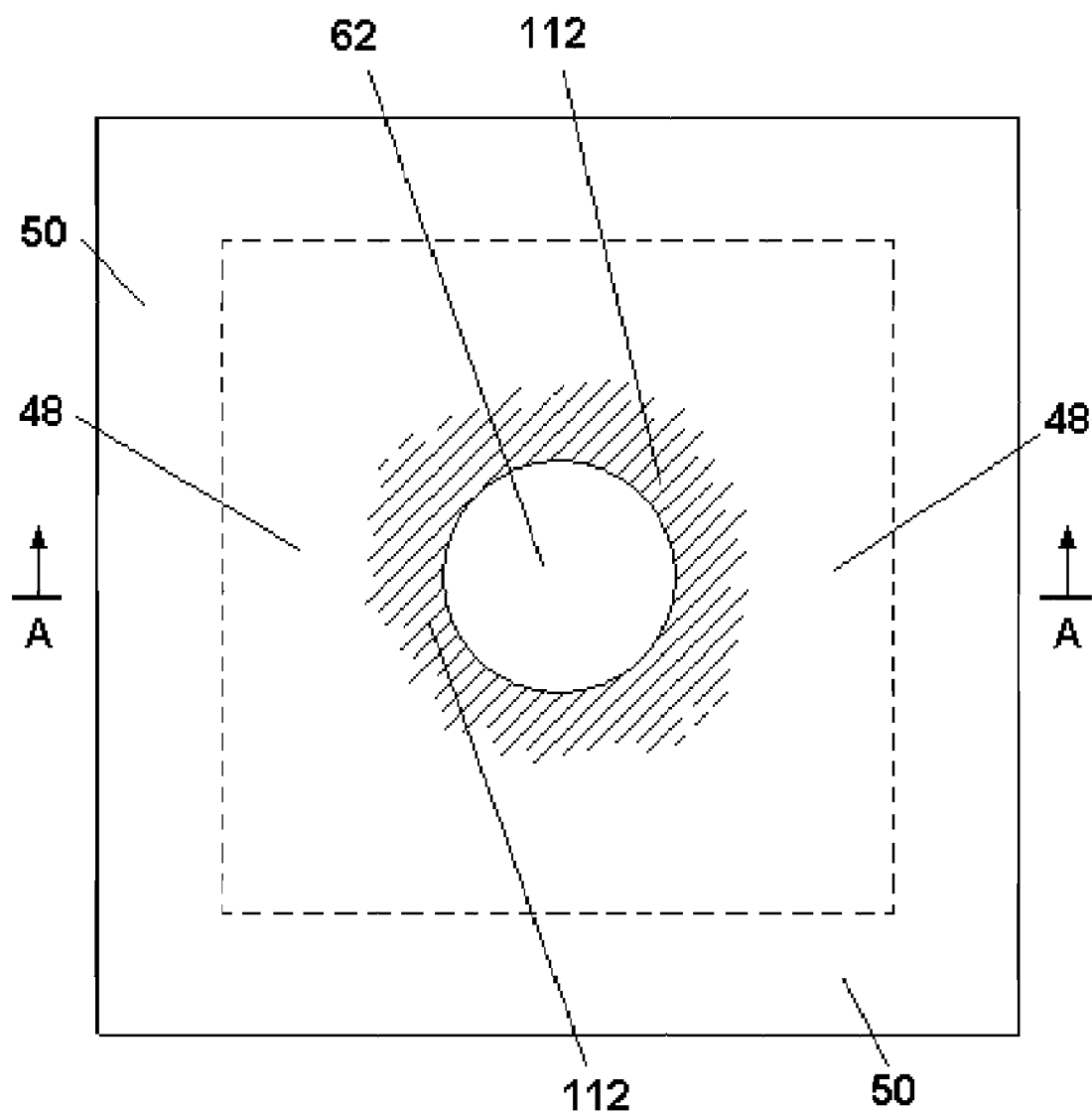

FIG. 9 shows mechanical structure of three-axis accelerometer according to the eighth embodiment. Mechanical structure of the three-axis accelerometer consists of a frame, a proof mass 14 and an elastic element in the form of a portion 112 of a uniform diaphragm. The frame has a thick portion 12 and a thin portion 48 having uniform thickness. Three-axis accelerometer further has a bottom cap 88 connected to the thick portion of the frame 12. The proof mass is separated from the bottom cap by the gap 89. The bottom cap has special mechanical structures—stops 87. Stops limit travel distance of the proof mass in different directions providing protection of the mechanical structure in case of shock overload.

Only a portion 112 of the uniform diaphragm is loaded with high mechanical stress during operation of the three-axis accelerometer. All other areas can be used for placement of IC components. In particular, the areas suitable for placement of IC components include: (1) top surface 50 of the thick portion 12 of the frame; (2) thin portion 48 of the frame located above the proof mass; and (3) stress-free top portion 62 of the proof mass. As it can be seen from FIG. 9, using thin portion 48 of the frame and top surface 62 of the proof mass the for placement of IC components provides a very significant increase in the area available for IC circuitry on the three-axis accelerometer die in comparison with the known in the prior art devices. This allows either reducing size of the sensor die 10 or integrating additional electronic circuits on the sensor die 10 of the same size. Reducing size of the three-axis accelerometer die reduces its cost. Integrating additional electronics on the sensor die 10 of the same size adds functionality and value to the device without affecting the cost. In both cases it makes three-axis accelerometer according to the present invention more attractive for high-volume applications.

Mechanical structure of three-axis accelerometer can be loaded by shocks significantly exceeding its range of measurements during its life cycle. These events typically occur during wafer processing (after release of the proof mass), packaging, assembly and/or handling of the packaged accelerometer, and handling of the device containing accelerometer. Breakage or mechanical damage of the elastic element as a result of shock overload is a catastrophic failure that can not be corrected. Therefore, providing sufficient protection of the mechanical structure from shock overload is one of the most important design objectives.

Movable mechanical structure of accelerometer can be protected from shock overload by using special mechanical structures—stops—that limit the maximum displacement of the proof mass and/or elastic element at a point that corresponds to a level of stress in the elastic element, which is significantly lower than the fracture limit of the elastic element material.

There are several major requirements to design of the stops. First of all, stops should protect the mechanical structure of accelerometer from shock overload in all directions. Stress in the elastic element can not exceed a predetermined critical level (typically the critical level of stress is chosen to be several times smaller than the fracture limit of the elastic element material) before the structure makes contact to stops. This requirement is especially important for three-axis accelerometers because they are sensitive to inertial force applied in any direction. Consequently, acceleration applied in any direction can cause unacceptably high stress in the elastic element if the acceleration has larger magnitude than the range of measurements and motion of the proof mass is not restricted. Second, stops should limit both forward motion and rotation of the mechanical structure. Third, mechanical structure should not stick to stops as a result of mechanical contact even if it has been pressed against the stops by an inertial force for some time. Fourth, neither proof mass nor elastic element should contact any of the stops when an inertial force applied to the device in an arbitrary direction is within the range of measurements.

The present invention describes some general solutions for protecting the mechanical structure of a three-axis accelerometer from mechanical overload with help of stops.

Figure 10:
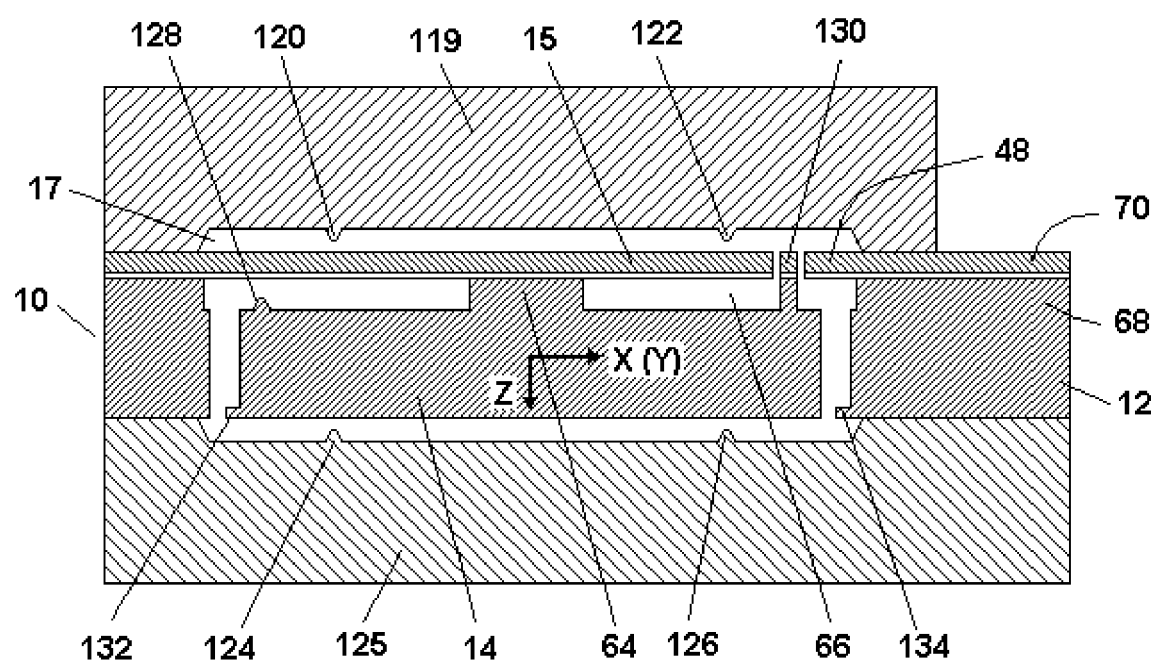
FIG. 10 shows mechanical microstructure of a three-axis accelerometer with top and bottom caps and different types of mechanical stops according to the ninth embodiment of the present invention.

Stops can be located both on the sensor die and on the caps. Stops in the sensor die can be located both on the proof mass, the frame, and on the elastic element. Preferably, stops formed in the sensor die are located on the proof mass and on the frame. FIG. 10 shows different types of stops that can be employed in the three-axis accelerometers according to ninth embodiment of the present invention. The three-axis accelerometer structure shown in FIG. 10 consists of a sensor die 10, top cap 119, and bottom cap 125. The sensor die 10 is fabricated from SOI starting material having handle layer 68 and device layer 70. Buried cavities 66 are formed in the initial SOI material. The sensor die 10 contains a frame 12, a proof mass 14 connected to an elastic element 15 in the central area 64. Top cap has a recess 17 above the elastic element 15. Stops 120, 122 are formed in the recess 17.

Stops 120, 122 formed in the top cap 119 limit upward displacement of the elastic element 15 and the proof mass 14. The same stops also limit displacement of the elastic element 15 and rocking motion of the proof mass 14 due to lateral acceleration (in X-Y plane). However, the stops 120, 122 formed in the top cap do not limit downward motion of the proof mass 14 and rotational motion of the proof mass 14 around the vertical (Z) axis.

Similarly, stops 124, 126 formed in the bottom cap limit downward displacement of the proof mass 14. The same stops also limit vertical displacement of the proof mass 14 in rocking motion due to lateral acceleration. However, the stops 124, 126 formed in the bottom cap do not limit upward motion of the proof mass 14 and rotational motion of the proof mass 14 around vertical (Z) axis.

Stop 128 is formed on the proof mass 14 in the buried cavity 66. Stop 128 limits both upward displacement of the proof mass 14 and its vertical displacement in rocking motion due to lateral acceleration. However, stop 128 does not limit downward motion of the proof mass 14 and rotational motion of the proof mass 14 around vertical (Z) axis.

Stop 130 is located on the proof mass 14 inside the cavity 66 and inside a through-hole in the thin part 48 of the frame. The stop has the shape chosen from the group of shapes consisting of: mesa, pole, boss, cylinder, prism, ridge, comb structure and combinations of these shapes. Stop 130 limits upward displacement of the proof mass 14, Its vertical displacement in rocking motion due to lateral acceleration, and rotational motion of the proof mass 14 around vertical axis. However, stop 130 does not limit downward motion of the proof mass 14.

Lateral stops 132, 134 can be formed either on the proof mass 14 as stop 132 or on the frame as stop 134. Stops 132 and 134 limit lateral movement of the proof mass 14 due to lateral acceleration. The same type of stops can be used to limit rotational motion of the proof mass 14 around its vertical axis. However, stops 132, 134 do not restrict vertical motion of the proof mass 14.

Stops 120, 122, 124, 126, and 128 are most effective in limiting the vertical displacement of the proof mass 14 and the elastic element 15. Although these stops restrict also vertical displacement of the proof mass 14 and elastic element 15 due to rocking motion of the proof mass 14 caused by lateral acceleration, they provide only limited protection against lateral overload because these stops limit only vertical displacement and do not limit lateral displacement of the proof mass caused by lateral acceleration. Stops 132, 134 are most effective in limiting lateral displacement of the proof mass 14. Stop 130 effectively limits both vertical (upwards) and lateral displacement of both the proof mass 14 and the elastic element 15 due to vertical and/or rocking motion of the proof mass 14. In addition to making contact with a top cap that limits vertical displacement it can make contact with the thin part 48 of the frame, which limits lateral displacement of the proof mass 14 and elastic element 15.

From the above description it is clear that several types of stops have to be used in the mechanical structure of a three-axis accelerometer in order to protect the mechanical structure from shock overload.

During the contact between the proof mass 14 or elastic element 15 and any of the stops 120, 122, 124, 126, 128 and 130 a contact force is originated in the contact areas. Both forces associated with physical adsorption (van-der-Waals forces), chemical bonds between the contacting surfaces, and electrical interaction between the surfaces contribute to the contact force. This force is commonly known as a sticking force. The sticking force is proportional to the contact area and, therefore, it can be characterized by a specific sticking force per unit of the contact area.

When the proof mass 14 is displaced from its neutral position, elastic element experiences some deformation proportional to the displacement of the proof mass. As a result of this deformation, a restoring force proportional to the displacement of the proof mass arises in the elastic element. The restoring force acts on the proof mass 14 and tends to return in to the neutral position.

In order to avoid sticking of the proof mass to the stops it is necessary to have sticking force smaller than the restoring force. Sticking force can be reduced by reducing the contact area and/or by reducing the specific sticking force, defined as a sticking force per contact area. Therefore, according to the present invention, the product of the specific sticking force and the contact area of all the stops the proof mass 14 and elastic element 15 can contact at the same time is required to be smaller than the restoring force provided by the elastic element at the moment of contact of the proof mass/elastic element with the stops.

Some designs of the three-axis accelerometers with shock overload protection are described in the next four embodiments.

Figure 11:
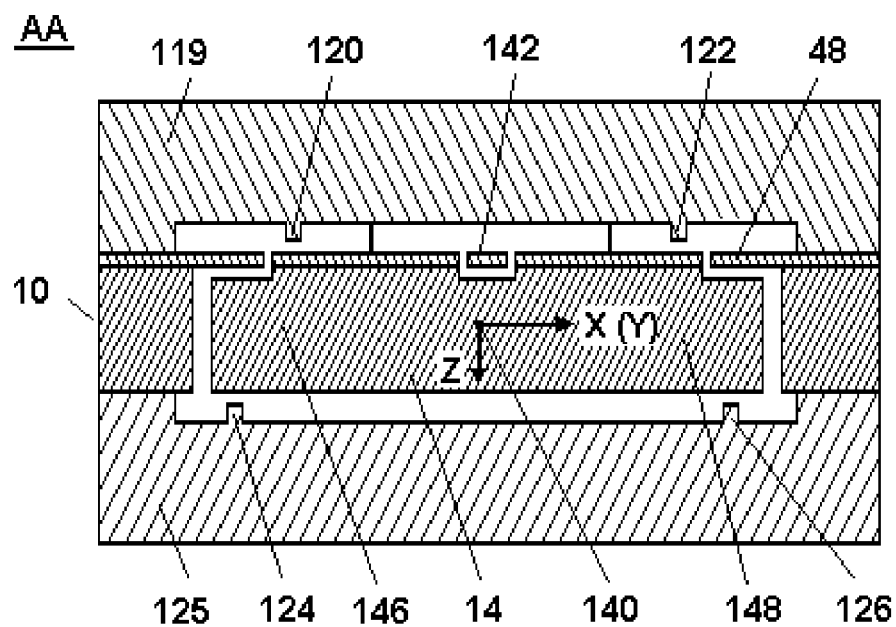
FIG. 11 shows mechanical microstructure of a three-axis accelerometer with the stops on the top and bottom caps according to the tenth embodiment of the present invention.
Figure 11:
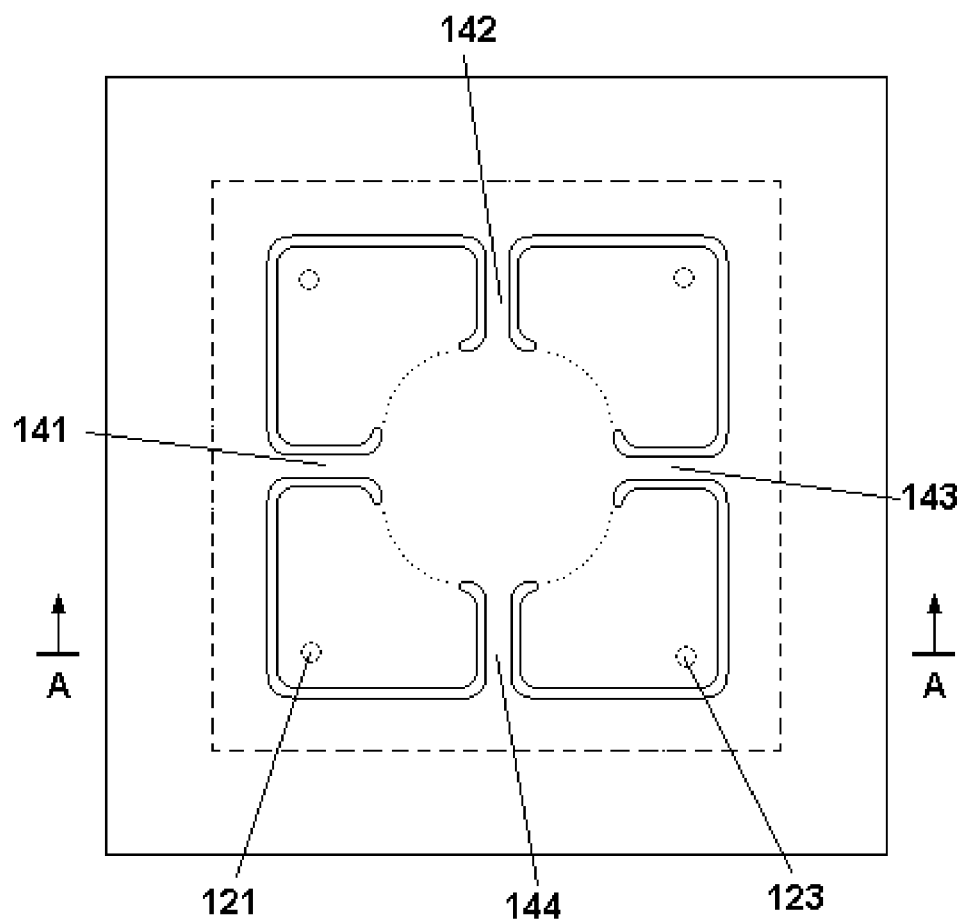

FIG. 11 shows a three-axis accelerometer according to the tenth embodiment of the present invention. The three-axis accelerometer contains a sensor die 10, a top cap 119, and a bottom cap 125. The proof mass 14 is formed within the sensor die 10 and suspended by elastic element in the form of four beams 141, 142, 143 and 144 The top cap has stops 120, 122. The bottom cap has stops 124 and 126. Size of the proof mass 14 is larger than the size of the elastic element. Therefore, a part of the proof mass 14 is located below the thin part 48 of the frame. At a certain level of vertical acceleration a contact between the proof mass and the stops 120 and 122, or stops 124, and 126 occurs in local areas, which are referred later as contact areas. Each stop 120, 122, 124, and 126 has a contact area and there are correspondent contact areas on the proof mass 14. The distances between the top surface of the proof mass 14 and the stops 120, 122 formed in the top cap 119 and between the bottom surface of the proof mass 14 and stops 124, 126 formed in the bottom cap 125 are chosen to be larger than the maximum vertical (Z) displacement of the proof mass 14 and the elastic element 141, 142, 143 and 144 under the vertical (Z) acceleration corresponding to the full-scale range of measurements, but smaller than the vertical displacement of the proof mass 14 and the elastic element 141, 142, 143 and 144 corresponding to the critical level of stress in the beams 141, 142, 143 and 144. Therefore, at least some of the stops 120, 122, 124, and 126 will restrict movement of the proof mass 14 and elastic element after inertial force in the vertical (Z) direction exceeds the range of measurements and before the maximum stress in the elastic element reaches the critical value.

As the center of gravity 140 of the proof mass 14 is located below the elastic element 141, 142, 143 and 144, the lateral acceleration acting in X-Y plane causes rocking motion of the proof mass 14. For example in response to the lateral acceleration in X direction shown in FIG. 11, the proof mass 14 tends to rotate around the axis defined by the center lines of the beams 142 and 144. As a result, one half 146 of the proof mass 14 moves upward while the other half 148 of the proof mass 14 moves downward. The moving upward part 146 of the proof mass 14 is getting closer both to the stop 120 formed in the top cap 119 and to the thin part of the frame 48. The moving downward part 148 of the proof mass 14 is getting closer to the stop 126 formed in the bottom cap 125. The distance between the contact areas on the proof mass 14 and stops 120, 122, 124, and 126 as well as the distance between the contact areas on the proof mass 14 and the thin part 48 of the frame is larger than the maximum displacement of the contact areas on proof mass 14 toward these stops caused by the lateral acceleration in X direction corresponding to the full-scale range of the three-axis accelerometer, but smaller than the displacement of the contact areas on the proof mass 14 and the suspension 141, 142, 143 and 144 corresponding to the critical level of stress in the beams 141, 142, 143 and 144. Therefore, at least some of the stops 120, 122, 124, and 126 will restrict rocking motion of the proof mass 14 and elastic element when an inertial force in lateral (X) direction exceeds the range of measurements and before the maximum stress in the elastic element reaches the critical value.

By placing stops along the diagonals between X and Y-axes it is possible to use the same stop to limit the maximum displacement of the proof mass/elastic element due to acceleration in both X and Y directions.

It is preferable to have the movable structure of the three-axis accelerometer contacting the stops at the levels of vertical and lateral acceleration, which correspond to about the same level of maximum stress in the elastic element and/or the same level of restoring force provided by the elastic element. The level of stress in the elastic element at the moment of contact with the stops should be smaller than the critical level of stress in the elastic element. The level of restoring force, preferably, should be several times higher than the maximum sticking force that occurs during the contact between the stops and the proof mass and/or elastic element.

Figure 12:
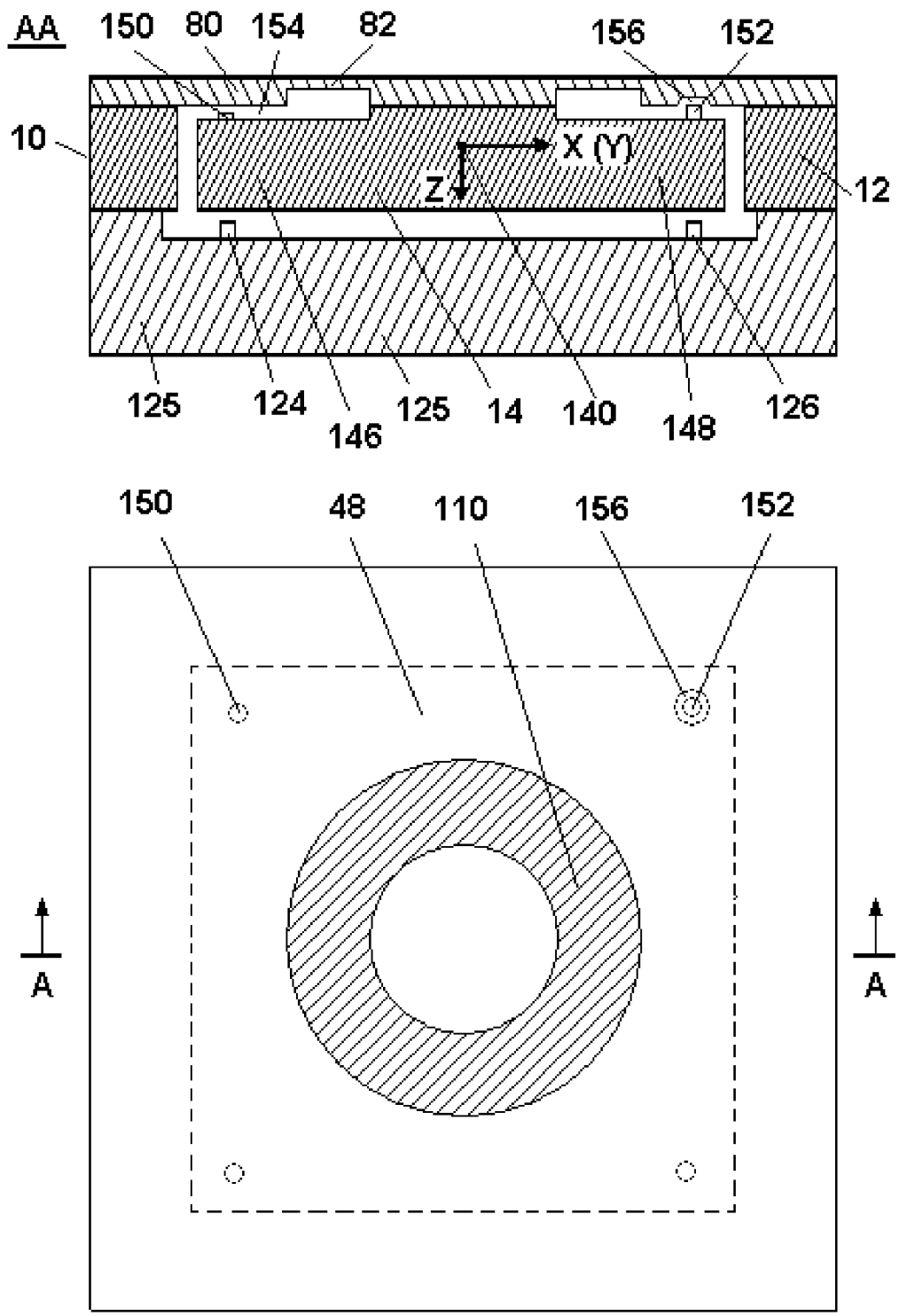
FIG. 12 shows mechanical microstructure of a three-axis accelerometer with the stops on the proof mass and on the bottom cap according to the eleventh embodiment of the present invention.

FIG. 12 shows mechanical microstructure of a three-axis accelerometer according to the eleventh embodiment according to the present invention. The three-axis accelerometer contains a sensor die 10 and a bottom cap 125. The proof mass 14 is formed within the sensor die 10 and suspended by elastic element in the form of annular diaphragm 110. The frame of the sensor die 10 has a thick portion 12 and a thin portion 80. The bottom cap has stops 124 and 126. Size of the proof mass 14 is larger than the size of the elastic element 110. Therefore, a part of the proof mass 14 is located below the thin part 80 of the frame. Stops 150 and 152 are formed on the proof mass 14 below the thin part 80 of the frame. At a certain level of vertical acceleration a contact either between the stops 150 and 152 and the thin part 80 of the frame or between the proof mass 14 and stops 124 and 126 occurs in contact areas. The distances between the stops 150 and 152 and the thin part 80 of the frame and between the bottom surface of the proof mass 14 and stops 124 and 126 are chosen to be larger than the maximum vertical (Z) displacement of the proof mass 14 and the elastic element 110 under the vertical (Z) acceleration corresponding to the full-scale range of measurements, but smaller than the vertical displacement of the proof mass 14 and the elastic element 110 corresponding to the critical level of stress in the annular diaphragm 110. Therefore, at least some of the stops 124, 126, 150, and 152 will stop movement of the proof mass 14 and elastic element when inertial force in vertical (Z) direction exceeds the range of measurements and before the maximum stress in the elastic element reaches the critical value.

As the center of gravity 140 of the proof mass 14 is located below the annular diaphragm 110, the lateral acceleration acting in X-Y plane causes rocking motion of the proof mass 14. For example, in response to the lateral acceleration in X direction shown in FIG. 12, one half 146 of the proof mass 14 moves upward while the other half 148 of the proof mass 14 moves downward. Due to the upward motion of part 146 of the proof mass 14 the stop 150 is getting closer to the surface of the thin part 80 of the frame and the bottom surface of moving downward part 148 of the proof mass 14 is getting closer to the stop 126 located on the bottom cap 125. The distance between the contact areas on the stops 150 and 152 and on the thin portion 80 of the frame and contact areas on the proof mass 14 and stops 124, and 126 is larger than the maximum decrease of distance between these contact areas due to the lateral acceleration in X direction corresponding to the full-scale range of three-axis accelerometer, but smaller than the displacement of the proof mass 14, which causes the critical level of stress in the annular diaphragm 110.

By placing stops 150, 152, 124, and 126 along the diagonals between X and Y-axes it is possible to use the same stop to limit the maximum vertical displacement of the proof mass/elastic element due to acceleration both in X, Y and Z directions.

Contact with the stops, preferably, occurs at the magnitude of either vertical or lateral acceleration applied to the proof mass, which corresponds to about the same level of maximum stress in the elastic element and/or the same level of restoring force provided by the elastic element. The level of stress in the elastic element at the moment of contact with the stops is smaller than the critical level of stress in the elastic element. The level of restoring force at the moment of contact, preferably, is several times higher than the maximum sticking force that occurs during the contact between the stops and the proof mass and/or elastic element.

The design presented in the eleventh embodiment has three major advantages over the design described in the previous embodiment: it does not require the top cap, it allows better control of the distance between the contact areas in the neutral position of the proof mass, and it allows better protection from the overload of the structure by a lateral (X-Y) acceleration.

Absence of the top cap makes cost of the three-axis accelerometer lower. Besides that, it decreases height of the die, which is important for some applications.

Control of the distance between the contact surfaces of stops and other parts of the accelerometer in the neutral position is very important. If this distance is too large due to technological tolerances then the level of stress in the elastic element can exceed the critical one before the contact with one of the stops occur. If this distance is too small due to technological tolerances then the proof mass can be stopped when the acceleration is still within the range of measurements. Both outcomes are unacceptable. Design of three-axis accelerometer according to the eleventh embodiment with the stops formed in the buried cavities allows better contact between the contact surfaces than design described in the tenth embodiment where stops are formed in the caps.

Variation of the distance between the contact surfaces of the stops and other parts of the accelerometer is determined by different factors. Technological tolerance on bonding layer thickness variation is among the most important ones. This variation is larger in case of bonding caps to the sensor wafers than in case of fusion bonding of profiled silicon wafers at SOI wafer fabrication. Therefore, the maximum displacement of the proof mass is better controlled with the stops formed in the buried cavities.

Finally, by making profiled contact area 156 in the device layer it is possible to provide better protection of the elastic element from lateral acceleration. If the lateral acceleration in the direction opposite to direction X shown in FIG. 12 is applied to the device then the stop 152 will be first contacting the top surface of the cavity 156 and this will restrict vertical motion of the proof mass 14. If the lateral acceleration increases then the stop 152 makes a contact with the side surface of the cavity 156 and this contact restricts horizontal movement of the proof mass 14 and provides complete protection from the lateral overload in (X-Y) plane.

Figure 13:
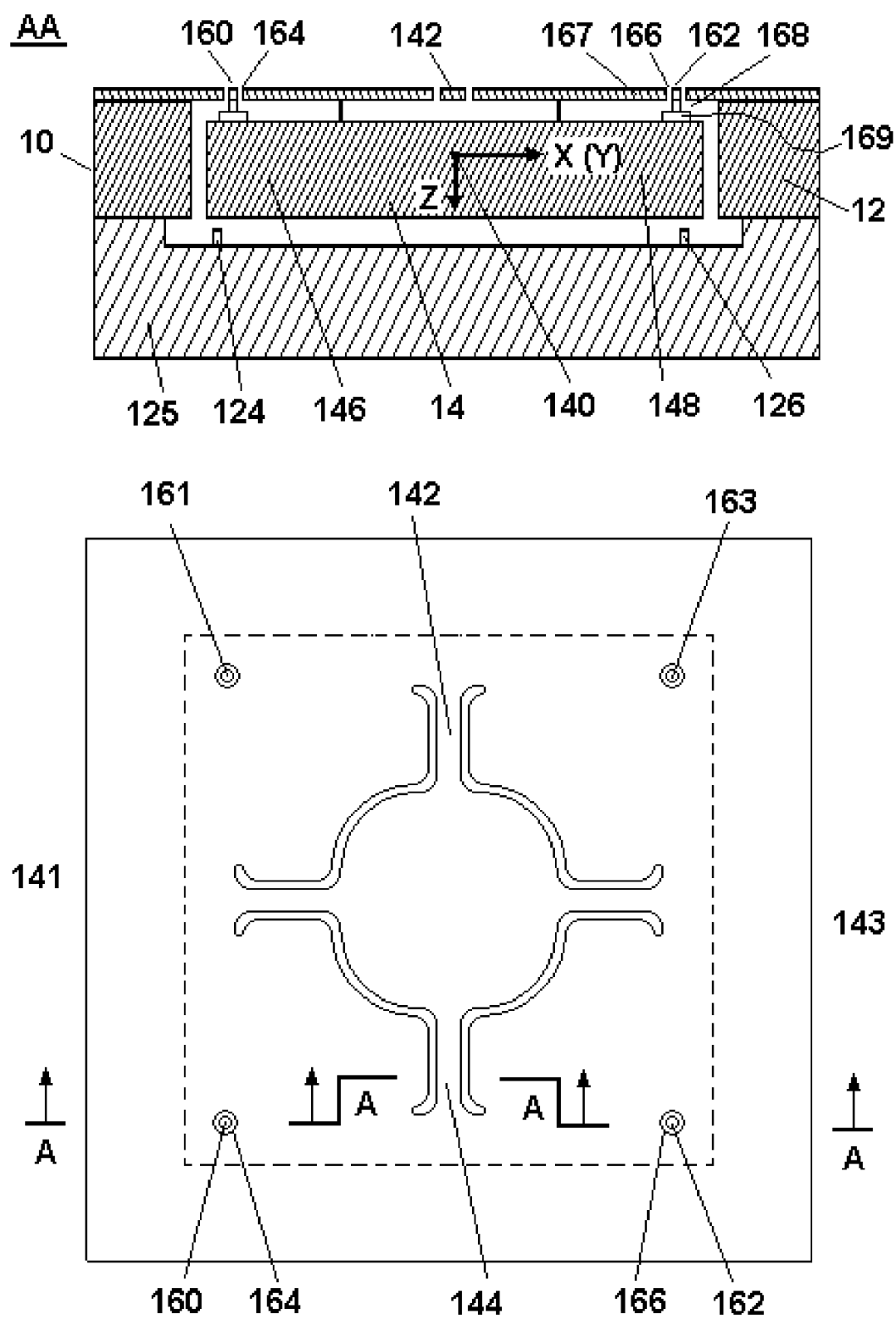
FIG. 13 shows mechanical microstructure of a three-axis accelerometer with the self-aligned stops on the proof mass and the stops on the bottom cap according to the twelfth embodiment of the present invention.

FIG. 13 shows mechanical microstructure of a three-axis accelerometer according to the twelfth embodiment according to the present invention. The three-axis accelerometer contains a sensor die 10 and a bottom cap 125. The proof mass 14 is formed within the sensor die 10 and suspended by an elastic element in the form of four beams 141, 142, 143, and 144. The frame of the sensor die 10 has a thick portion 12 and a thin portion 167. The bottom cap has stops 124 and 126. Size of the proof mass 14 is larger than the size of the elastic element 110. Therefore, a part of the proof mass 14 is located below the thin part 167 of the frame. Self-aligned stops 160 and 162 are connected to the proof mass 14 and located inside through holes 164 and 166 in the thin part 167 on the frame. The self-aligned stops 160 and 162 have two parts: higher part and lower part. For example, stop 162 has a higher part 162 and a lower part 169.

At a certain level of vertical acceleration a contact either between the lower parts 169 of the stops 160 and 162 and the thin part 167 of the frame or between the proof mass 14 and stops 124 and 126 occurs in contact areas. The distances between the lower portions 169 of the stops 160 and 162 and the thin part 167 of the frame and between the bottom surface of the proof mass 14 and stops 124 and 126 are chosen to be larger than the maximum vertical (Z) displacement of the proof mass 14 under the vertical (Z) acceleration corresponding to the full-scale range of measurements, but smaller than the vertical displacement of the proof mass 14 corresponding to the critical level of stress in the beams 141, 142, 143 and 144. Therefore, at least some of the stops 124, 126, and 169 will stop movement of the proof mass 14 and elastic element when inertial force in the vertical (Z) direction exceeds the range of measurements and before the maximum stress in the elastic element reaches the critical value.

As the center of gravity 140 of the proof mass 14 is located below the beams 141, 142, 143 and 144, the lateral acceleration acting in X-Y plane causes rocking motion of the proof mass 14. For example, in response to the lateral acceleration in X direction shown in FIG. 13, one half 146 of the proof mass 14 moves upward while the other half 148 moves downward. Due to the upward motion of part 146 of the proof mass 14 the stop 160 is getting closer to the inner surface of the through hole 164 in the thin part 167 of the frame and the bottom surface of moving downward part 148 of the proof mass 14 is getting closer to the stop 126 located on the bottom cap 125.

Contact between the higher part of the stop 160 and 152 and the inner surface of the through hole 164 in the thin part 167 of the frame and contact between the proof mass 14 and stop 126 occurs at a lateral acceleration in X direction, which is larger than the full-scale range of the accelerometer, but smaller than the acceleration, which causes the critical level of stress in the beams 142, 144.

By placing stops 160, 162, along the diagonals between X and Y axes it is possible to use the same stop to limit the maximum vertical displacement of the proof mass due to acceleration both in X, Y and Z directions.

Contact with the stops, preferably, occurs at the magnitude of either vertical or lateral acceleration applied to the proof mass, which corresponds to about the same level of maximum stress in the elastic element and/or the same level of restoring force provided by the elastic element. The level of stress in the elastic element at the moment of contact with the stops is smaller than the critical level of stress in the elastic element. The level of restoring force at the moment of contact, preferably, is several times higher than the maximum sticking force that occurs during the contact between the stops and the proof mass and/or elastic element.

The design presented in the twelfth embodiment has certain advantages over the design described in the tenth embodiment: (1) it does not require the top cap; (2) it allows better control of the distance between the contact areas in the neutral position of the proof mass; and (3) it allows protection from the overload of the structure by a rotational acceleration around the vertical (Z) axis.

Stops 160, 162, 169 incorporated in the design of the sensor die provide protection of the elastic element from shock overload in all lateral (X-Y) directions and vertical shock causing upward movement of the proof mass. Besides that, the same stops also protect the structure from rotational acceleration. Therefore, top cap is not needed. Absence of the top cap makes cost of the three-axis accelerometer lower. Height of the die without top cap is also smaller, which is important for some applications.

Finally, stops 160, 162, 169 consisting of two parts and located inside the hole formed in the thin part 167 of the frame allow additional level of protection of the elastic element. Besides protection from overload by lateral acceleration and vertical acceleration, which causes upward motion of the proof mass, these stops protect the structure from rotational accelerations in all directions, including rotational acceleration around the vertical axis, i.e. a better level of protection from shock and overload than provided by stops in the structures described in the tenth and eleventh embodiments of the present invention.

Figure 14:
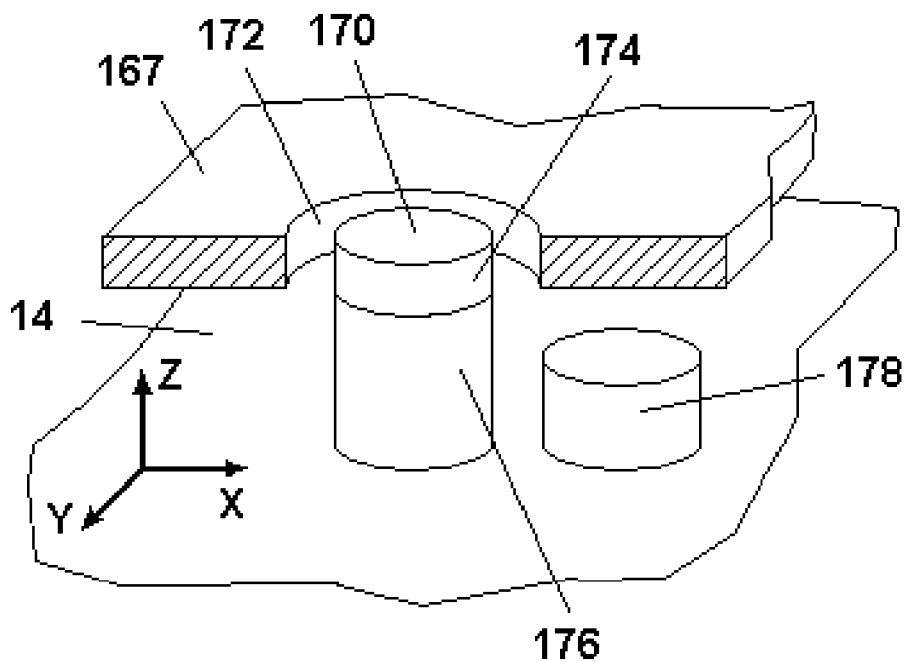
FIG. 14 shows mechanical microstructures of the self-aligned stops having two parts limiting motion of the proof mass in different directions according to the thirteenth embodiment.
Figure 14:
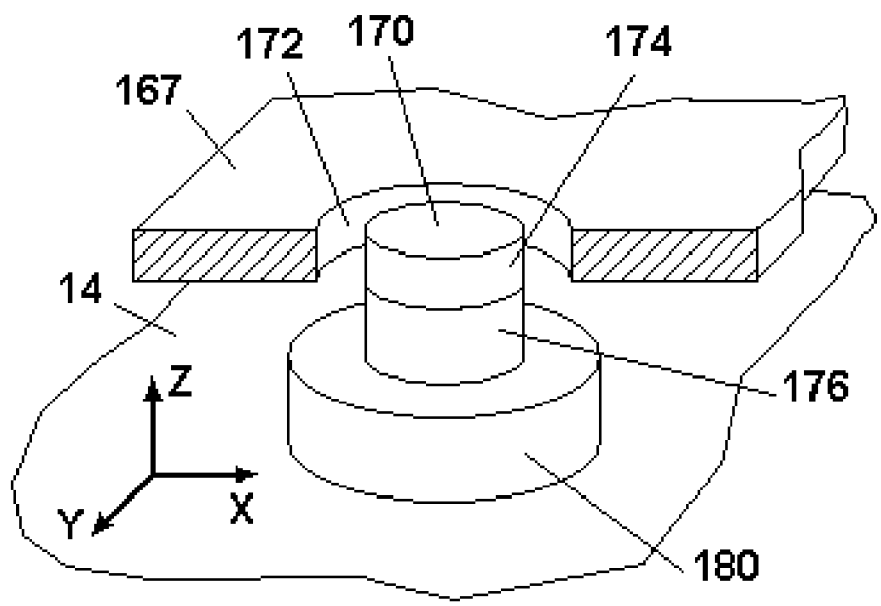
Figure 15:
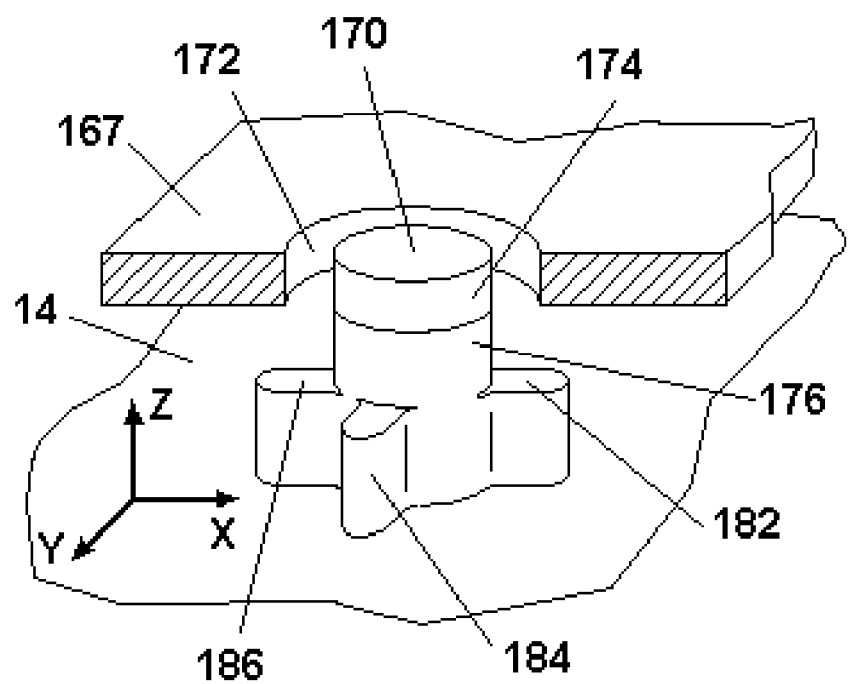
FIG. 15 shows different versions of mechanical microstructures of the self-aligned stops limiting motion of the proof mass in different directions according to the thirteenth embodiment.
Figure 15:
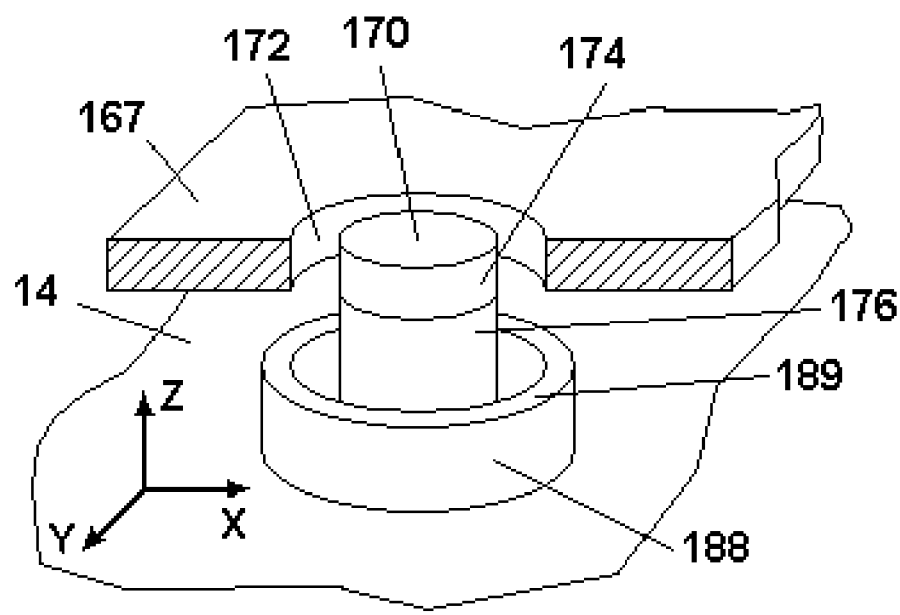
Figure 15:
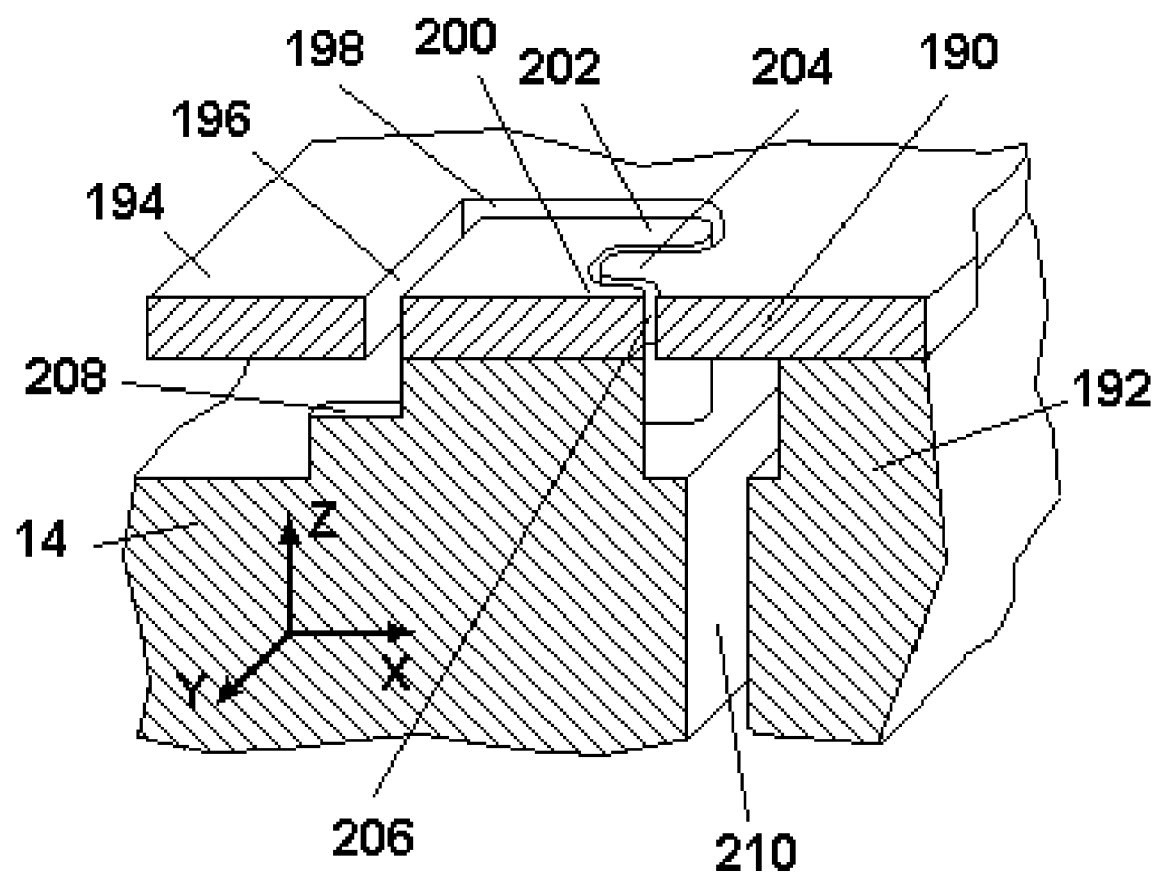

The last thirteenth embodiment is illustrated by FIG. 14 and FIG. 15. It describes both general design of the self-aligned stops having two parts and some preferred designs of such stops.

FIG. 14a shows a general design of a two-part self-aligned stop according to the present invention. The stop has two parts: higher part 174 and lower part 178. Both parts of the stop are located on the proof mass 14. The higher stop 170 is located inside the hole 172 etched in the thin portion 167 of the frame. The higher stop consists of a portion 176, which belongs to the handle layer, and a portion 170, which belongs to the device layer. When the proof mass 14 is overloaded by vertical (Z) acceleration and moving upward the lower stop 178 provides protection of the elastic element by making contact with the thin part 167 of the frame. The higher stop 174 does not provide protection from overload in vertical (Z) direction. When the proof mass is overloaded by lateral (X-Y) acceleration it moves in rocking mode and the higher stop 174 makes contact with the side surface of the hole 172 providing complete protection from overload by acceleration in X-Y plane.

FIG. 14b shows design of a two-part self-aligned stop 174 located on the proof mass 14, in which the lower stop 180 located inside the buried cavity serves as a pedestal for the higher stop 170. The higher stop 170 is located inside the hole 172 in the thin part 167 of the frame. As in the general case described above, the lower stop 180 limits upward motion of the proof mass 14 due to vertical acceleration and the higher stop 170 limits rocking motion of the proof mass 14 due to lateral acceleration in X-Y plane.

In order to reduce sticking force, it is important to provide a small contact area between the lower stop and the thin portion 167 of the frame. Some designs, which allow reduction of the contact area and, therefore, reduction of sticking force are shown in FIG. 15a-b.

FIG. 15a shows a two-part self-aligned stop 174 located on the proof mass 14. The two-part stop 174 has a higher stop 170 in the form of a cylindrical post formed inside the hole 172 in the thin part 167 of the frame and lower stop formed as a combination of four ridges 182, 184, 186. The lower part of the stop 174 protects the elastic element from shock overload in vertical (Z) direction by making contact with the thin part 167 of the frame. Sticking force between the lower part of the stop 174 and the thin part 167 of the frame is reduced in comparison with the cylindrical lower stop shown in FIG. 14b because the four ridges have a significantly smaller contact area than the cylinder having the same overall dimensions in the X-Y plane as the stop in the form of four ridges.

FIG. 15b shows another design of a two-part self-aligned stop 174, which has a lower stop 188 formed as a rim 182. The lower stop 188 protects the elastic element from shock overload in vertical (Z) direction by making contact with the thin part 167 of the frame. Sticking force between the lower stop 188 and the thin part 167 of the frame is reduced in comparison with the cylindrical lower stop shown in FIG. 14b because the rim have a significantly smaller contact area 189 than the cylinder having the same diameter.

Besides shape of the lower stop, additional protection of the elastic element can be achieved by using different shapes of the higher stop. FIG. 15c shows a two-part self-aligned stop located on proof mass 14, which has a lower stop 208 with a small contact surface and a higher stop 200 formed in a hole in the thin part 194 of the frame. A pin 204 is defined at the sidewall of the opening in the thin part 194 of the frame formed around the higher stop 200. The high stop protects the elastic element from lateral (X-Y) shock overload and from overload with rotational acceleration around vertical (Z) axis by making contact with the thin part of the frame 196, 198, 206. Width of the gap separating the pin 204 and the higher stop 200 is smaller than the gap 210 separating the proof mass 14 and the thick part 192 of the frame. This prevents contact between the proof mass 14 and the thick part 192 of the frame, which may cause sticking of the proof mass.

Other shapes of both higher stop and lower stop can be used in three-axis accelerometers. Some of the shapes are: mesa, pole, boss, lug, cylinder, ridge, rim and combinations of those.

It should be understood that the microstructures of the sensor die do not limit the present invention, but only illustrate some of the various technical solutions covered by this invention. While the invention has been described in detail with reference to preferred embodiments, it is understood that variations and modifications thereof may be made without departing from the true spirit and scope of the invention. For example, although not mentioned specifically, the method of measuring three components of inertial force vector can also be applied to capacitive sensors as well as other types of sensors.

What is claimed is:

1. A three-axis accelerometer for determining components of an inertial force vector with respect to an orthogonal coordinate system, the accelerometer comprising:
   a sensor die having side 1 and opposite side 2, die made of a semiconductor substrate consisting of layer 1 and layer 2 of semiconductor materials attached to each other and having a at least one cavity at the interface between the layer 1 and layer 2, cavity made within the thickness of at least one of the layers 1 or 2; the cavity has overall dimensions and has a projection on the plane of side 1 of the sensor die;
   the sensor die comprising:
   a frame element consisting of part 1 having thickness and part 2 having uniform thickness smaller than thickness of part 1; part 2 is located within the projection of the cavity, surrounded by part 1 in the plane of side 1 and occupies an area on the side 1 of the sensor die;
   a proof mass element located within the semiconductor substrate, having overall dimensions, having a projection on the plane of side 1 of the sensor die and occupying an area on the side 1 of the sensor die;
   an elastic element having overall dimensions and occupying an area on the side 1 of the sensor die; elastic element mechanically couples the frame element and the proof mass element on side 1, wherein an inertial force applied to the proof mass element induces stress in the elastic element;
   mechanical-stress sensitive IC components located on elastic element and providing signals for determining components of applied inertial force;
   at least one digital signal processing circuit coupled to accelerometer for processing signals from stress-sensitive IC components;

at least one cap having thickness and mechanically coupled to the frame element from at least the side 2 of the sensor die, whereby for the purpose of minimizing the area occupied by both proof mass element and elastic element on the side 1 of the sensor die without decreasing the sensor sensitivity;

the area occupying by both proof mass element and elastic element on the side 1 of the sensor die is made smaller than the area occupying by part 2 of the frame on the side 1 of the sensor die;

at least one digital signal processing circuit is integrated within part 2 of the sensor die frame;

the overall dimensions of the cavity in the plane of side 1 of the sensor die exceed the corresponding overall dimensions of the elastic element and the elastic element is located within the projection of the cavity;

at least two overall dimensions of the proof mass element exceed the corresponding overall dimensions of the elastic element and part 2 of the frame at least partially is located within the projection of the proof mass element.

2. A three-axis accelerometer of claim 1, further comprising a proof mass, thickness of which exceeds thickness of part 1 of the frame but is less than the combined thickness of the part 1 of the frame and the cap coupled to the side 2 of the sensor die.

3. A three-axis accelerometer of claim 1, wherein the elastic element has at least one opening in its thickness dimension.

4. A three-axis accelerometer of claim 1, wherein the elastic element has at least two portions of different thickness.

5. A three-axis accelerometer of claim 1, where the elastic element in the sensor die has the shape chosen from the group of shapes consisting of: ring, perforated ring, n-sided faceted geometry, beams, tethers, springs and combinations of these shapes.

6. A three-axis accelerometer of claim 1, wherein the elastic element contains at least one stress concentrating element having a shape selected from a group of shapes consisting of: V-groove, trapezoidal groove, a groove with the sidewalls forming an angle in the range of 85 degrees to 95 degrees with the surface of the elastic element, pyramid, prism, ridge, rim, boss, mesa and combinations of these shapes.

7. A three-axis accelerometer of claim 1, wherein at least one digital signal processing circuit providing one or more functions from a group of functions consisting of: providing reference signals, signal conditioning, signal amplification, multiplexing, signal filtering, analog-to-digital conversion, analog-to-frequency conversion, acceleration dependent oscillation, signal processing, synchronization, voltage stabilization, current stabilization, memory, temperature compensation, digital interface, power management, transmitting and receiving radio-signals.

8. A three-axis accelerometer of claim 1, further comprising components used in other sensors chosen from the group of sensors consisting of: temperature sensor, magnetic sensor, radiation sensor, optical sensor, image sensor, humidity sensor, chemical sensor, pressure sensor, tactile sensor, force sensor, acoustic sensor, angular rate sensor, mass flow sensor.

9. A three-axis accelerometer of claim 1, wherein the stress sensitive IC components are chosen from the group consisting of: a piezoresistor, a p-n junction, a tunnel diode, a Schottky diode, a shear stress component, a piezoresistive Wheatstone bridge, a MOS transistor, a complementary pair of CMOS transistors, a bipolar transistor, a pair of p-n-p and n-p-n bipolar transistors, a bipolar transistor and at least one piezoresistor, a MOS transistor and at least one piezoresistor connected to transistor, a bipolar transistor circuit, and a CMOS transistor circuit.

10. A three-axis accelerometer of claim 1, wherein the inertial force induces stress in the elastic element not exceeding critical stress and the elastic element creates a restoring force applied to the proof mass, further comprising at least four mechanical stops limiting linear and angular displacements of a proof mass element caused by inertial force applied in any direction;

at least four mechanical stops:

have contact area and characterized by a specific sticking force, equals to sticking force per unit area, originating within a contact area between a contact surface of stops and a contact surface of the other parts of accelerometer at the moment of contact; have contact area smaller than the ratio of the restoring force at the moment of contact to the specific sticking force and;

have the distance between the contact surface of stops and a contact surface of the other parts of accelerometer greater than the displacement of the proof mass corresponding to the range of measurement plus the additional displacement of the proof mass creating the restoring force greater than the specific sticking force multiplied by the contact area of the stops and smaller than the displacement of the proof mass corresponding to the critical mechanical stress in the elastic element;

whereby at least part of at least one stop is located within at least one cavity.

11. A three-axis accelerometer of claim 10, wherein at least one mechanical stop consists of two parts of different height, part 1 and part 2, part 1 limIts displacement of the proof mass element under applied inertial force exceeding the measurement range in lateral X or Y directions and part 2 limits displacement of the proof mass element under applied inertial force exceeding the measurement range in normal Z direction.

* * * * *